United States Patent [19]

Teng

[11] Patent Number: 4,642,758

[45] Date of Patent: Feb. 10, 1987

[54] FILE TRANSFER SCHEDULING ARRANGEMENT

[75] Inventor: Albert Y. Teng, Bolingbrook, Ill.

[73] Assignee: AT&T Bell Laboratories, Murray Hill, N.J.

[21] Appl. No.: 631,176

[22] Filed: Jul. 16, 1984

[51] Int. Cl.[4] ............................................. G06F 13/00
[52] U.S. Cl. ....................................................... 364/200
[58] Field of Search ........................ 364/200 MS File

[56] References Cited

U.S. PATENT DOCUMENTS 4,342,083  7/1982  Freedman et al. .................. 364/200

OTHER PUBLICATIONS

"An Overview of BLN: A Bell Laboratories Computing Network" K. E. Coates D. L. Dvorak, and R. M. Watts, Proceedings of the Seventh Data Communications Symposium, Mexico City, Mexico, Oct., 1981, pp. 224-229.

"Architecture for User and Network Management Services in a Heterogeneous Computer Network", K. E. Coates and K. E. Mackey, Proceedings of the Fifteenth Hawaii International Conference on System Sciences, Honolulu, Hawaii, Jan., 1982, pp. 636-645.

"A File Transfer System for Scheduling File Transfers in the Bell Labs Network" A. Y. Teng, J. Yao, B. Gopinath and K. Sabnani, Proceedings of IEEE INFOCOM 83, San Diego, Calif., Apr. 1, 1983.

"Scheduling File Transfers in a Distributed Network", E. G. Coffman, Jr., M. R. Garey, D. S. Johnson and A. S. LaPaugh, ACM Principles of Distributed Computers, 1983, Aug. 19, 1983, pp. 254-266.

*Primary Examiner*—Raulfe B. Zache
*Attorney, Agent, or Firm*—Peter Visserman

[57] ABSTRACT

A method and arrangement for scheduling the transmission of data files among a plurality of interconnected computers is disclosed. When a first computer desires to transmit data files to a second computer, the first sends a short duration message to the second defining a future time when transmission will occur. If this future time is available on the second computer, a short duration acknowledgment message is returned to the first. If the future time is not available on the second computer, no acknowledgment message is returned. The first computer transmits the data files to the second at the future time, if an acknowledgment message has been received. Such data file transmission does not occur if no acknowledgment message has been received. However, the first computer may send a new request specifying a different future time. Alternatively, a request message may contain a plurality of future times for data file transmission. In this situation, the acknowledgment message from the second computer will specify the one of those future times at which data file transmission is to occur.

25 Claims, 36 Drawing Figures

| NSR ID | USER PRIORITY | FILE DESCRIPTION FOR SOURCE | DESTINATION | FILE DESCRIPTION FOR DESTINATION | TOTAL BYTES |
|---|---|---|---|---|---|

FIFO REQUEST QUEUE

*FIG. 3*

MANAGER MODULE

SCHEDULABILITY ROUTINE

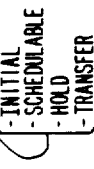

HOLD LIST FIG. 11

| NSR ID | DESTINATION | TIME STAMP | NSR/DEST |
|---|---|---|---|

APPOINTMENT BOOK TABLE FIG. 12

| APPT ID | PEER APPT ID | PEER NODE ID | IN/OUT | START TIME | END TIME | HIGH PRIORITY | LOW PRIORITY | TOTAL BYTES | OPEN/CLOSED | STATE |
|---|---|---|---|---|---|---|---|---|---|---|

STATE: – RESERVED – COMMITTED – TRANSFER

TUNING VALUE TABLE FIG. 13

| MAXIMUM NUMBER APPT | MAXIMUM NUMBER APPT/DEST | PRIORITY FLOOR | MAXIMUM SIZE BATCH | MAXIMUM SIZE REQUEST |
|---|---|---|---|---|

INVITE REQUEST TIMER FIG. 14

| DESTINATION ID | TIME STAMP | APPT ID |
|---|---|---|

APPOINTMENT REQUEST TIMER FIG. 15

| DESTINATION ID | TIME STAMP | APPT ID |
|---|---|---|

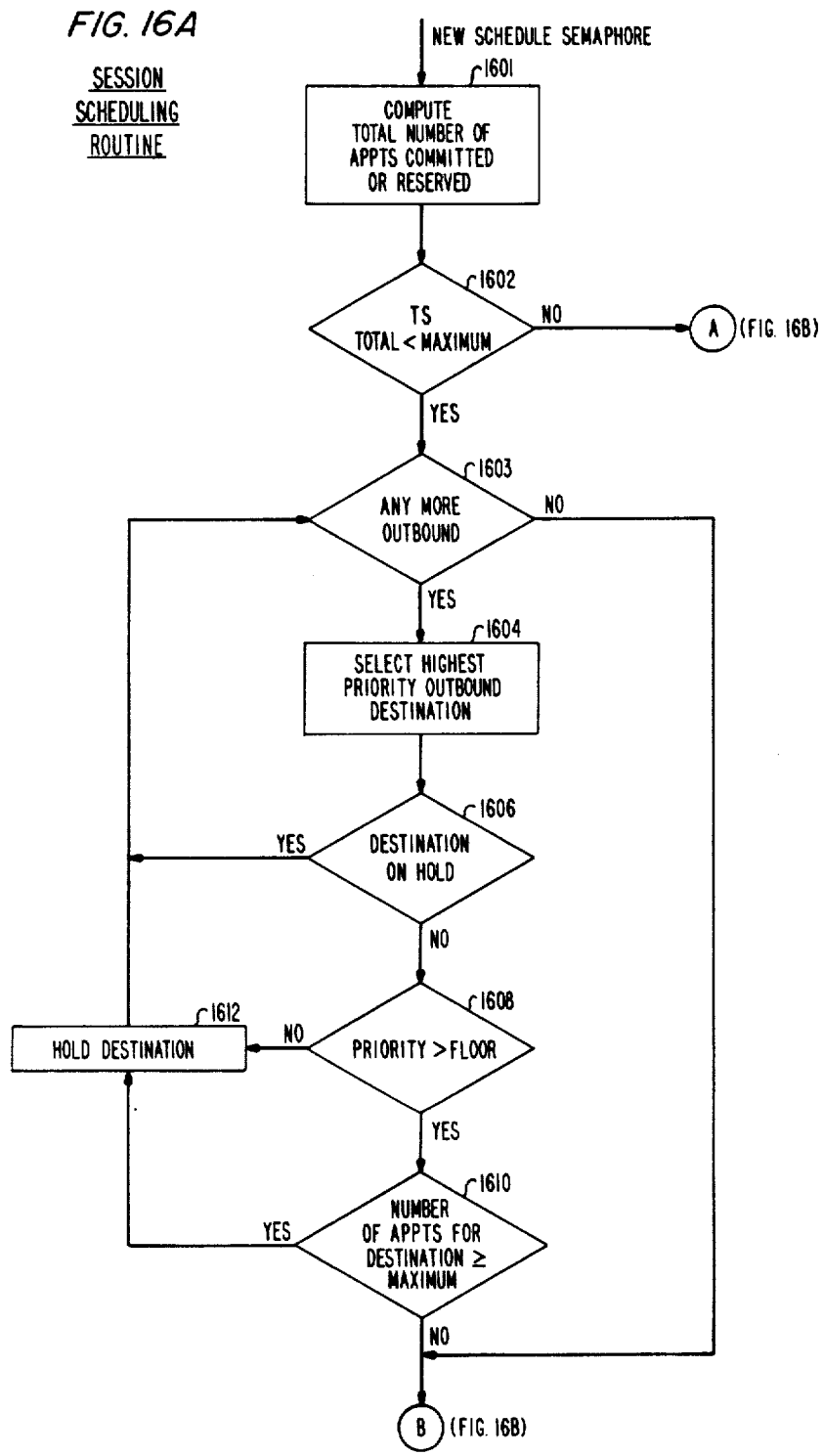
FIG. 16A SESSION SCHEDULING ROUTINE

FIG. 17

MESSAGE FORMATS

| REQUEST APPT | APPT ID | START TIME | END TIME | TOTAL BYTES | HIGH PRIORITY | LOW PRIORITY |
|---|---|---|---|---|---|---|

| CANCEL APPT | PEER APPT ID |
|---|---|

| ACCEPT APPT | PEER APPT ID | SOURCE APPT ID | START TIME | END TIME | TOTAL BYTES | HIGH PRIORITY | LOW PRIORITY |
|---|---|---|---|---|---|---|---|

| REJECT APPT | PEER APPT ID |
|---|---|

| INVITE REQUEST | TRANSMIT NODE ID |
|---|---|

| REQUEST SESSION | PEER APPT ID |
|---|---|

| ACCEPT SESSION | PEER APPT ID | TE ID |
|---|---|---|

| REJECT SESSION | PEER APPT ID |
|---|---|

INBOUND PROCESSING ROUTINE

OUTBOUND PROCESSING ROUTINE

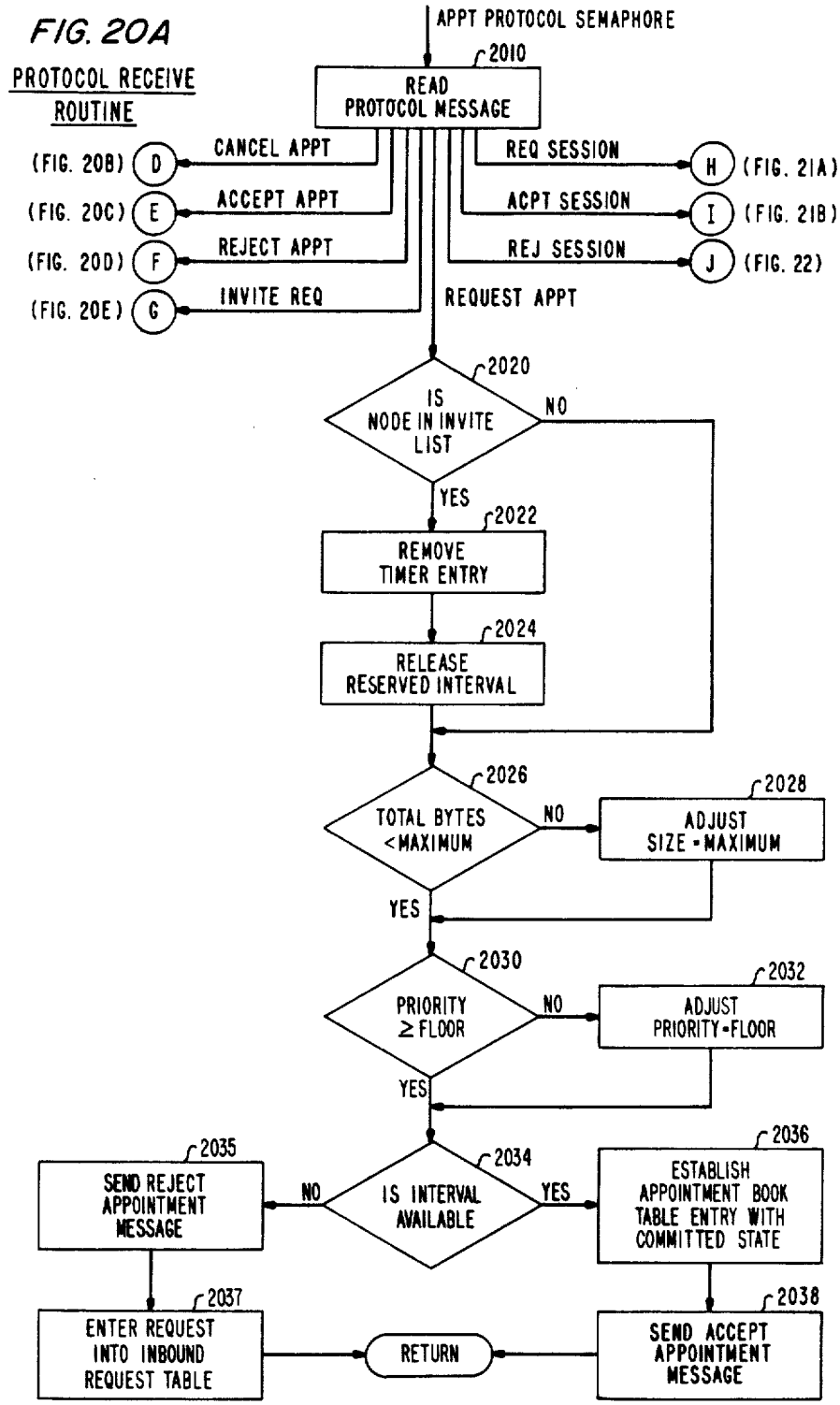

| SESSION ID | DESTINATION ID | TIME STAMP |
|---|---|---|

REQUEST SESSION TIMER

*FIG. 23*

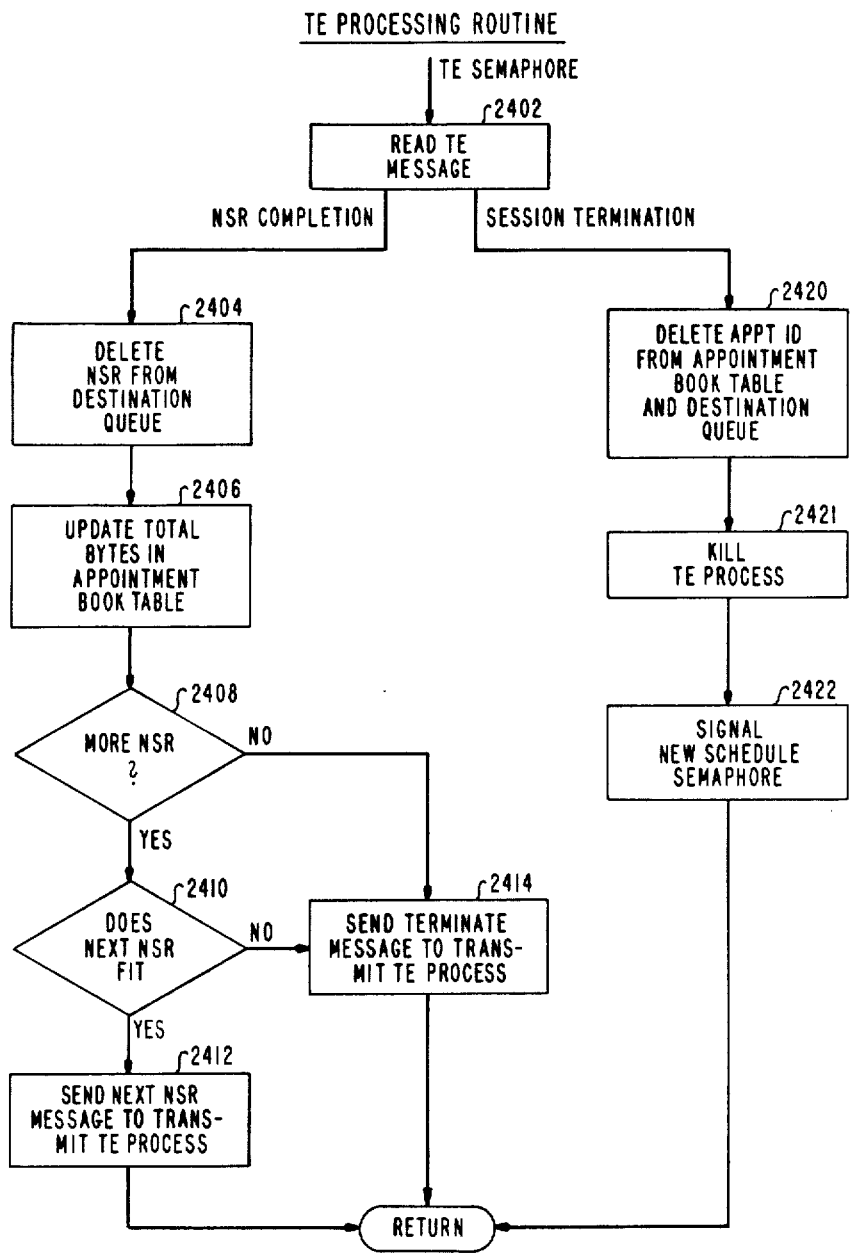

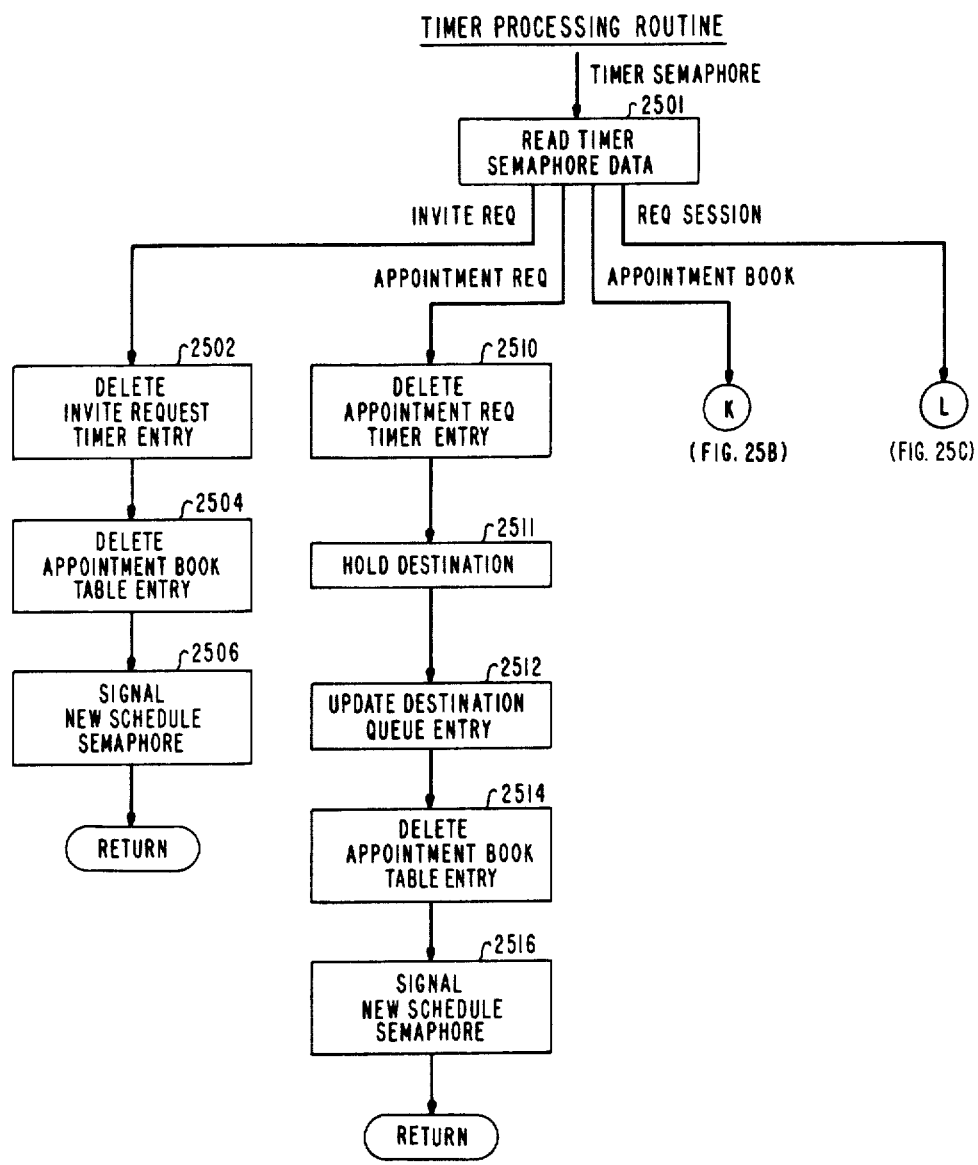

FILE TRANSFER SCHEDULING ARRANGEMENT

TECHNICAL FIELD

The invention relates to file transfer systems, and more particularly, to a method and apparatus for controlling transferring of data files among a plurality of computers.

BACKGROUND OF THE INVENTION

Data transfer systems for transferring data files among data processing stations, such as general purpose computers, are well known. Data transfer network exists wherein a number of computers are interconnected and each computer is a node in the network. Data files are transferred through the network using established network protocols. In such networks the separate computer installations may provide a variety of computing services at the various nodes of the network and the interconnecting network links make it possible for one computer system to use the services of another. This kind of interaction is customarily accompanied by an extensive transfer of data files between computer installations. File transfers are initiated in response to user requests which can be handled only when the data transfer resources are available. Each node in the network has one or more data transfer facilities which form the network interface at the node. These facilities include hardware and software and the number of active facilities affects network congestion and affects the availability of computer resources at each of the nodes. The network links are expensive and increasingly in demand as the network grows. The transfer facilities also are expensive and their activation requires the use of computer resources in demand for other purposes.

In order to transfer a data file from one node to another, the sending node must have a transfer facility available for transmission and the receiving node must have a transfer facility available to receive the file. It may well be that a transfer facility is not available at the receiving node at the time that an attempt to transfer is made by the sending station. In that case, the attempt will be unsuccessful and the transfer facility which was available at the transmitting end may be used to transmit files to a different destination. Hence, it may not be available when facilities at the original destination become free. It can be seen, that with such an approach it is possible that some files will be delayed in their transfer a much longer period of time than other files. In fact, it is not unusual to find that files destined for certain destinations consistently encounter long delays.

In some networks the unavailability of facilities at the receiving end is detected only by setting up a connection and testing for availability. Unsuccessful transfer attempts unnecessarily add to network congestion and may interfere with other transfers. This adds to the expense of the network and degrades network performance.

It is an object of this invention to make optimum use of the network transfer facilities and to avoid unnecessary network congestion.

SUMMARY OF THE INVENTION

In accordance with this invention, these and other prior art problems are overcome by a method and apparatus for arranging an appointment for file transfer prior to the actual transfer of the file. In accordance with one aspect of the invention, a data processing station transmits an appointment request message defining a future time for a file transfer and transmits the file at the time defined by the appointment request message. In accordance with another aspect of the invention, the destination receiving the appointment request message responds by sending an acknowledge message and the originating station transmits the file at the defined future time only if a proper acknowledge has been received. In accordance with another aspect of the invention, the originating station transmits an appointment request message defining one or more blocks of available time for the transfer of a file and the receiving station selects one of the time periods and transmits an acknowledge message defining the selected time period. Thereafter, the originator transfers the identified file to the designated destination during the time defined by the acknowledge message. In accordance with yet another aspect of the invention, requests for the transfer of data files are assigned a priority and are transferred, based on the availability of transfer facilities, in their order of priority.

Furthermore, highest priority work may be selected from either inbound or outbound requests. Levels of priority may be assigned on the basis of user preference and work may be further prioritized within these levels based on file size. In accordance with another aspect of the invention, an appointment of a particular duration may be reserved and a plurality of files may be formed into a batch to transfer a plurality of files in the reserved period of time. Furthermore, a request for appointment may be made specifying the highest and lowest priority levels of requests included in a batch and the receiving side may accept only priorities greater than a predetermined floor priority. Further, in accordance with this invention, the number of appointments that one installation has with all other installations may be limited to a predetermined number and the maximum number to any particular location may be similarly limited.

Advantageously, the use of prearranged appointments, which may be established through data messages which are easily and inexpensively transmitted, avoids unsuccessful file transfer attempts before a file can be transferred and reduces network congestion. Furthermore, by the use of priority levels assigned to messages and selecting high priority files for early appointments, certain files can be given preferred treatment over other lower priority files. Advantageously, the use of appointments and batching avoids the separate connection set-up activity and unsuccessful attempts for each individual file to be transferred, so common in prior art systems.

It is a further advantage to this invention that the traffic between installations can be regulated by shifting certain transfers from busy times to slower times. Furthermore, by the use of limitation on the number of appointments, data transfer resources are more fairly apportioned.

BRIEF DESCRIPTION OF THE DRAWING

The invention may be better understood from the following detailed description when read with reference to the drawing in which:

FIG. 3 represents a memory entry format for the request queue of FIG. 2;

FIGS. 7 through 15 represent formats for various memory entries used in this illustrative system;

FIGS. 16A and 16B are flowchart representations of the session scheduling routine of the manager module process of FIG. 4;

FIG. 17 shows formats of messages exchanged between nodes;

FIGS. 18, 19A and 19B, 20A through 20E, 21A and 21B, and 22 are flowchart representations of routines of the manager module process of FIG. 4;

FIG. 23 represents the format for a memory entry used for timing purposes;

FIGS. 24 and 25A through 25C are flowchart representations of the routines of the manager module process of FIG. 4.

DETAILED DESCRIPTION

Figure 1:
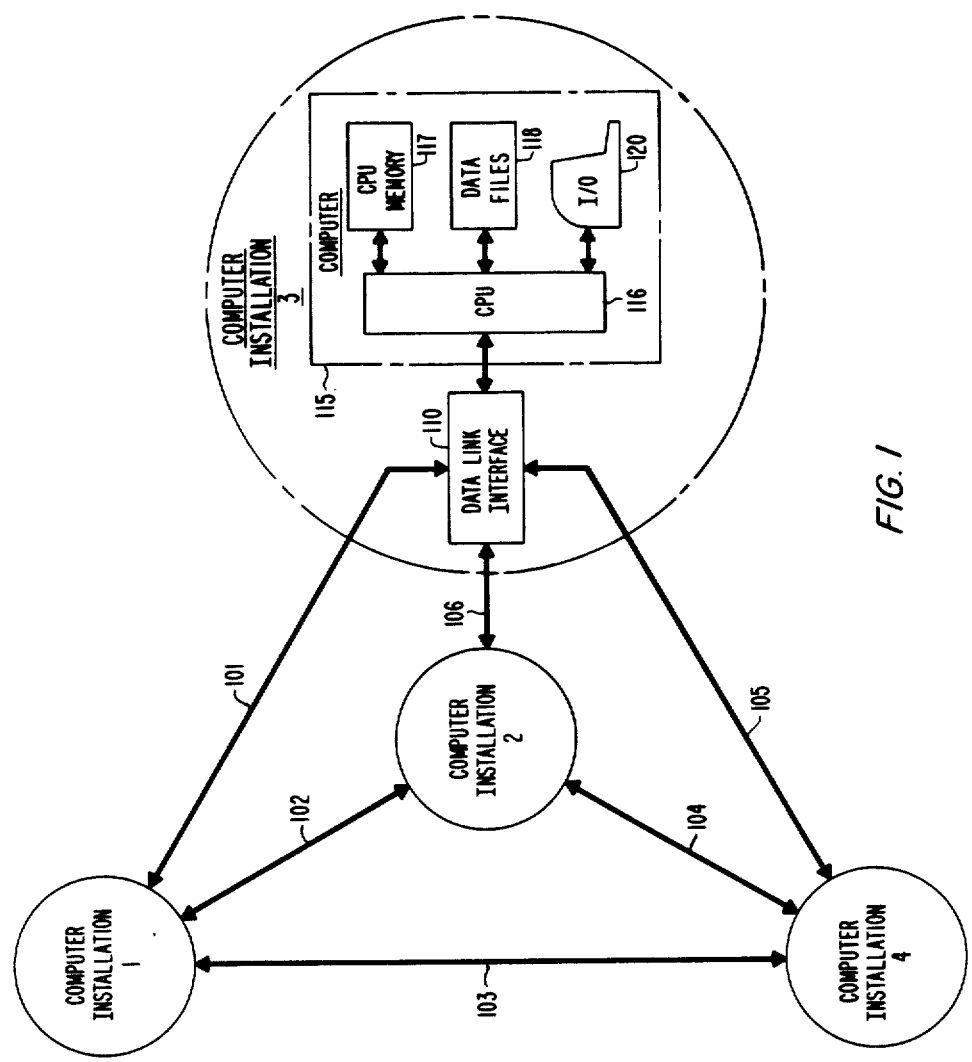
FIG. 1 is a functional block diagram of a number of interconnected computer installations.

FIG. 1 is a representation of a plurality of physically separated computer installations 1 through 4 interconnected via data links 101 through 106 to form a computer network. Computer networks of this type are well known and amply described in the literature. FIG. 1 shows only four computer installations for illustrative purposes. The network may be reasonably extended to any number of computer installations.

The computer installation 3 has been expanded in FIG. 1 to show the major system elements present in a computer system. Installations 1, 2 and 4 include similar system elements. As suggested in FIG. 1, each of the installations may have several data links connected to it and the computer is connected to the associated data links by means of data link interface equipment 110. Also depicted is a computer 115, which may represent a number of computers as is typically found in a large computer installation. The computer includes a central processing unit (CPU) 116 connected to a memory 117 for storing programs and data, a data file system 118 for storing data files, and input/output equipment 120. Each computer will include application software and network software dedicated to network functions. The network software performs a number of functions, such as translating between host computer specific data formats and commands and standard network representations; establishing virtual circuits and handling datagram messages; packetizing of data; and routing each packet to its destination. In this illustrative system, the interconnecting network may be any well-known data transfer network. One such network is the ARPANET, which is well-described in the literature. Data link protocol routing algorithms and interface protocol for networks of this type are described, for example, in Tannenbaum, Prentice-Hall, Inc. 1981, *Computer Networks*. Another network, referred to in the literature as the Bell Labs Network (BLN), is described in Coates, Dvorak and Watts, "An Overview of BLN: A Bell Laboratories Computing Network", *Proceedings of the Seventh Data Communications Symposium*, October, 1981, and in related papers.

Figure 2:
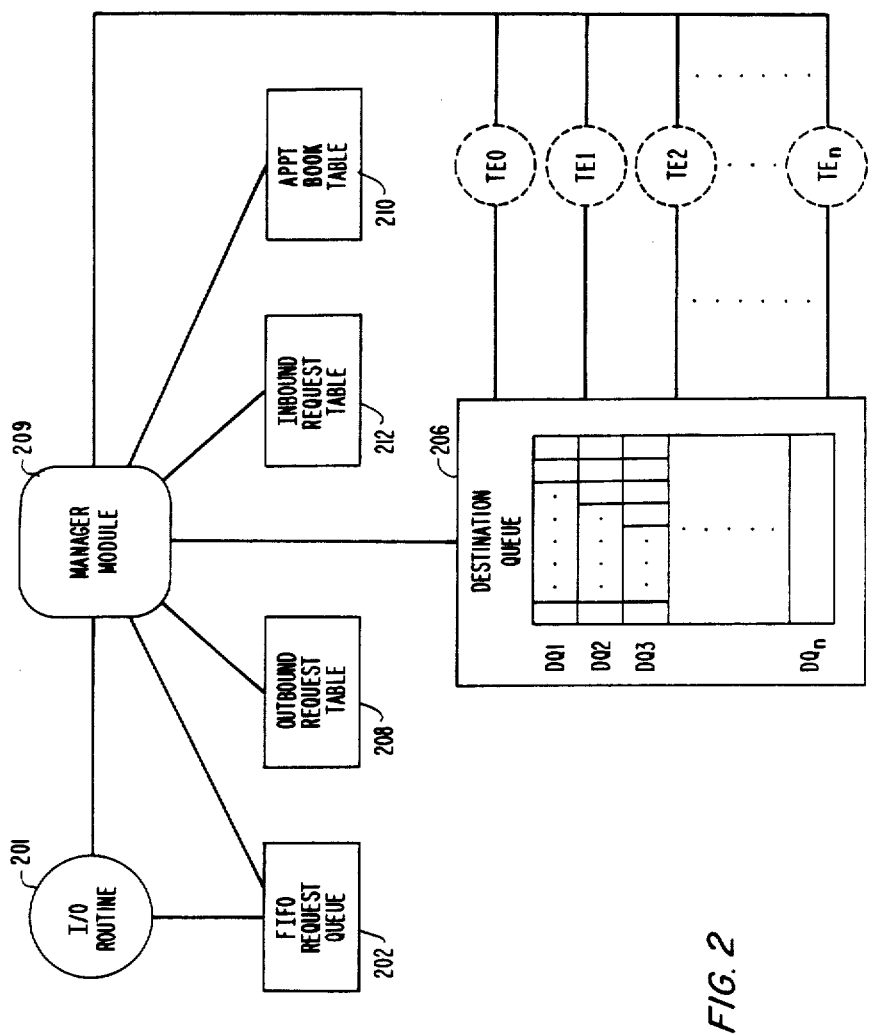
FIG. 2 is a functional representation of a data transfer arrangement in accordance with the invention including memory blocks.

To transfer a file between nodes of the network, the availability of the data transfer resources of the sending and receiving host computers must be synchronized. In this illustrative embodiment of the invention, the users submit a file transfer request to the file transfer scheduler system. A functional diagram of the structure of the file transfer system is shown in block diagram form in FIG. 2. The file transfer scheduler of the sending node negotiates with the receiving node to set an appointment for a future data file transfer. The scheduler arranges requests by priority, forms batches of requests to the same destination and initiates a transfer session via the network at the appointed time. The file transfer scheduler system described herein will normally be resident on a host computer with other software and system components which are well known. Such other systems will be described herein only to the extent that it is necessary to gain an understanding of the operation of the file transfer scheduler system. The file transfer scheduler may be implemented on any number of well-known general purpose computers such as an IBM-360, a Digital VAX-1170 or other computers capable of performing the individual actions detailed herein. In this illustrative embodiment, it is assumed that each of the computer installations 1 through 4 of FIG. 1 contains all of the subsystems described herein. It is possible, however, that a subset of the subsystems exists in some of the computer installations, which would allow a subset of the features described herein to be implemented.

A software routine commonly found in computer systems is the input/output routine which controls input/output devices such as the terminal 120 of FIG. 1. I/O routine 201 shown in FIG. 2 may be any well-known routine adapted to handle such interactions, and need not be described in detail herein. The data file system 118 will include storage devices such as disks or tapes and the computer will include software for building, controlling and administering the files. A user may desire to have a file transferred from the computer where the file is resident to another node of the network. To initiate the transfer, the local user will initiate a request to the system which is accepted by means of the I/O routine 201 of FIG. 2. The user will provide certain information about the file and the destination which is received by the I/O routine 201 and placed in the FIFO (first-in,first-out) request queue 202. This entry will be in the form of a network service request (NSR), containing the necessary information to fully define the request. The queue 202 resides in a reserved area of memory 117 and may be of any desired size commensurate with system requirements. The format for the entry is shown in FIG. 3. In addition to storing the request in the queue, the I/O routine 201 signals a semaphore, referred to as the new job semaphore (NJ), to manager module 209. This is one of a number of semaphores which serve to notify the manager module 209 of work to be done. A request for file transfer from the host computer may also be made by datagram from a remote location and entered in the request queue 202 by means of network software, not described herein. In either case, when an entry is made in the request queue, the new job (NJ) semaphore is signaled.

The manager module 209 comprises a number of software routines which are executed in response to various semaphores. In general, the manager module 209 responds to the new job (NJ) semaphore by reading a request from the FIFO request queue 202 and placing it in the destination queue 206. This queue resides in a reserved section of memory 117 and comprises one list or queue for each destination with which the node communicates. The service requests are entered in each destination queue by priority and are subsequently obtained from the queue and serviced by the use of an appropriately activated transfer entity (TE) such as TE-O through TE-n. The transfer entity is equivalent to a network port and interacts with the network in that it requests the establishment of virtual circuit data transfer paths via the network and accesses and transfers files or receives and stores files via virtual circuits set up in the network. Network ports and these network related functions are well understood by thoses skilled in the art and need not be described in detail herein. The manager module 209 communicates with the transfer entities to activate them at the appropriate time. The format for the destination queue entry is shown in FIG. 10. The manager module 209 maintains a summary of work in the queues for the various destinations in the outbound request table 208 also stored in memory 117. This table contains an entry for each destination, the format for which is shown in FIG. 9.

The manager module 209 also maintains an appointment book table 210 in memory 117. Before transfer of any file to another destination takes place, the manager module requests an appointment from the destination node specifying one or more desired starting times and the time period required for transmission. When a request for appointment is made, an entry is made in the appointment book table and is confirmed when the appointment has been accepted. Conversely, when a file is to be received, an appointment is requested by the sending node. The nodes communicate by means of messages such as a request appointment, accept appointment, etc. The format for these and other messages is shown in FIG. 17. The messages are transferred between nodes by means of datagrams. Datagrams are messages sent through the network requiring short duration connections through the network and without the necessity of a long-term virtual circuit. Datagrams and the method for transmitting them are well known in the art and need not be described herein.

The manager module 209 also maintains an inbound request table 212 in memory 117. In the event that another network node requests an appointment which cannot be accepted, an entry is made in the inbound request table. When the system becomes ready to accept other appointments, the manager module will send a message to the node which was denied an appointment to invite that node to make a request at that time. The format for an inbound request table entry is shown in FIG. 8.

MANAGER MODULE

Figure 4:
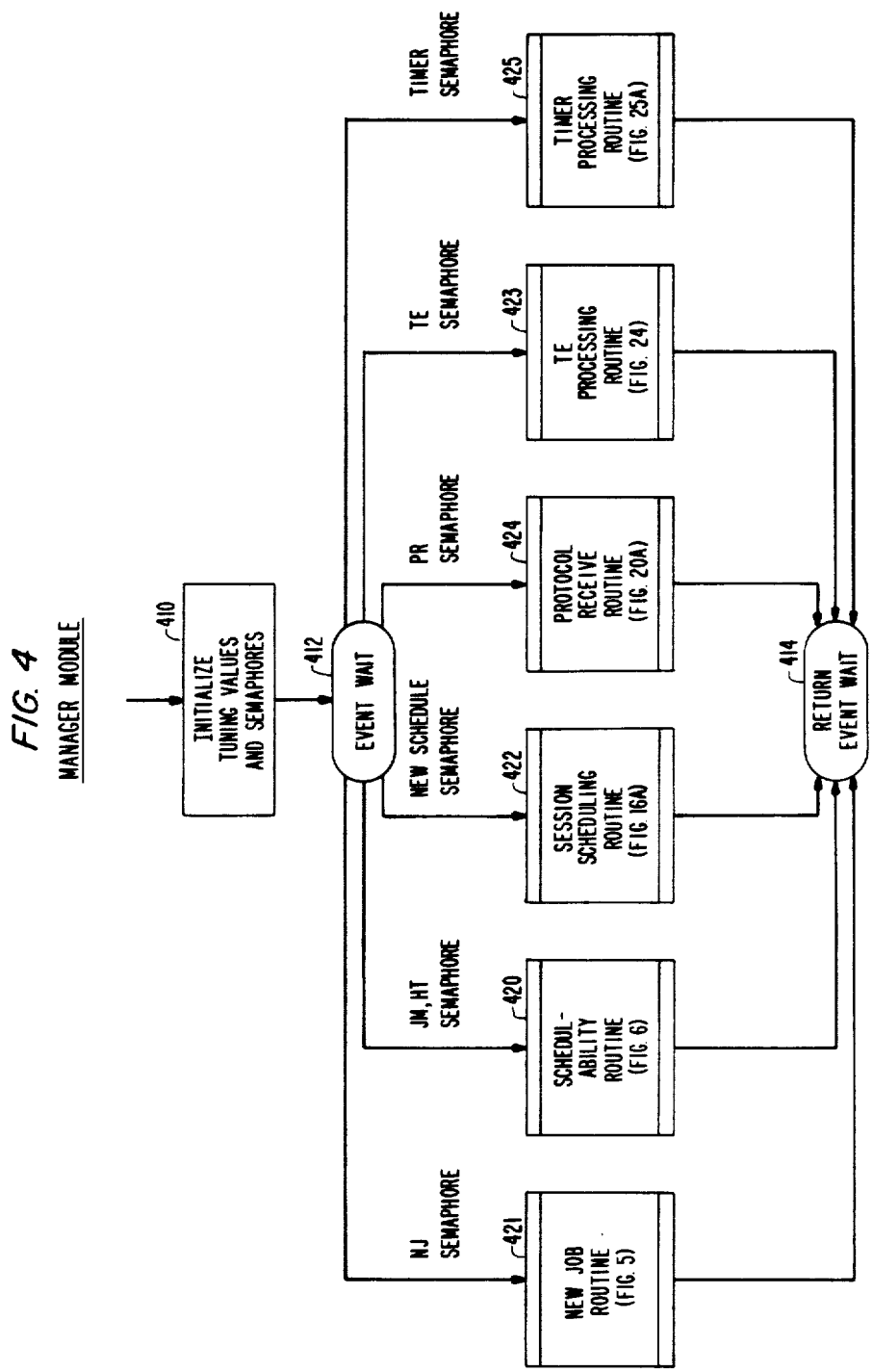
FIGS. 4 through 6 are flowchart representations of the manager module process of FIG. 2 and certain of its routines.

FIG. 4 shows the manager module consisting of 6 separate routines 421–425 and having an EVENT WAIT state 410 and an initialization routine. The initialization routine is a common routine for setting initial values of parameters used in file transfer scheduling and for initializing the semaphores used to initiate the execution of routines. The transfer parameters are determined by system requirements and operational objectives. A number of the parameters are recorded in a tuning value table stored in memory 117. The layout for this table is shown in FIG. 13. Included in the tuning value table is a number representing the maximum number of appointments which the system will handle at any particular time. This may be, for example, 20 appointments. Another number in the table is the maximum number of appointments per destination. This number, for example, may be 3 appointments per destination, and is chosen to avoid an excessive number of appointments to one destination in preference over another destination. Another entry in the table is the priority floor. Priority may range, for example, from 0 to 100 and the priority floor may be set initially to low value, e.g. 5, and raised at a later point in time to avoid handling low priority work during peak times. The priority floor can be adjusted from time to time depending upon the traffic load on the system. Another number in the tuning value table is the maximum size batch. A batch consists of several requests and to meet operational objectives, the maximum size is limited. For example, the maximum size batch may be ten megabytes of data, where a byte equals eight bytes. Similarly, the maximum size request is defined to avoid very large requests which could prevent other transfer activity for extended periods of time. The maximum size of the request may, for example, be one megabyte. The initialization of the tuning value table occurs at system initialization and, as indicated above, these values may be updated from time to time depending upon system activity and operational demands.

The manager module EVENT WAIT state 412 is used to wait for appropriate semaphores to be set. The wait state will include a routine which periodically checks the semaphores and responds to the semaphores one at a time. A priority routine may be used to handle certain semaphores such as the protocol receive (PR) semaphore which is activated when a protocol message is received from another location. Other semaphores may be given lower priority in desired order. The use of semaphores to perform signaling between programs is well known to those skilled in the art. A semaphore may be accompanied by a message statement, for example, the protocol receive semaphore will be accompanied by a statement identifying the message type. Furthermore, counting semaphores are used which are incremented each time a signal is received and decremented each time they are serviced.

When a semaphore has been signaled to the manager module, the process starts by leaving the EVENT WAIT state and executing the indicated routine. The new job (NJ) semaphore is set, as mentioned earlier, when a new request is entered into the request queue 202 and in response to this semaphore the new job routine 421 is executed. During the execution of this routine, the JM semaphore is signaled. This semaphore or the HT semaphore will cause the execution of the schedulability routine 420. The HT semaphore, as well as the timer semaphore, which initiates execution of the timer routine 425, are signaled by a standard well-known time-out program which periodically compares time stamps entered in tables or lists with the current system time. When a time-out has occurred, the appropriate semaphore will be signaled. The new schedule semaphore, which causes execution of the session scheduling routine 422, may be set by any number of other routines of the manager module. The protocol receive (PR) semaphore is signaled by the network software when a datagram message for the manager module is received. It is used to initiate execution of the protocol receive routine 424. The TE semaphore which is signaled by a transfer entity process, is used to initiate execution of the TE event routine 423. On completion of any of these routines, a return is made, as indicated in block 414, to the EVENT WAIT state to wait for a semaphore to be signaled. Each of the routines 420 through 425 are discussed in subsequent paragraphs with respect to other figures of the drawing.

JOB ROUTINE

Figure 5:
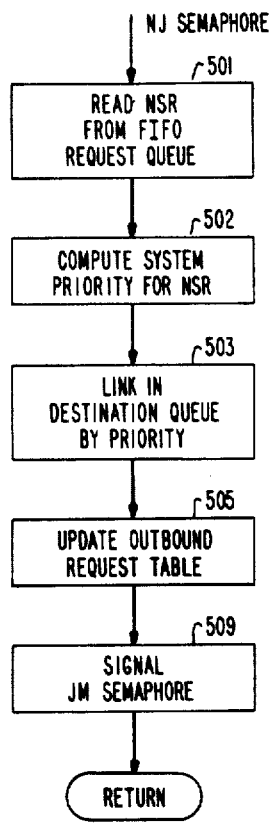

FIG. 5 is a flowchart detailing the functions executed by the new job routine. This routine is part of the manager module and is entered in response to the NJ semaphore. As indicated in block 501, the new job routine reads the network service request from the request queue 202. For each service request in the request queue there is a separate entry, the format of which is shown in FIG. 3. This includes a designation of the destination and user priority. As indicated in block 502, system priority is computed. When the request is made, a user will indicate a desired priority. This may be premium, regular, or deferrable priority. This priority information, together with the size of the request, is used to compute a system priority for the request. In this illustrative system, the priority is divided in a range from zero to 100. A minimum priority, referred to as the floor priority, is initially set at level 5 and deferrable requests are entered in the range from 5 to 35, regular requests are entered in the range from 35 to 65 and premium requests are entered in the range from 65 to 95. The request size is defined by the total bytes of the files to be transferred. There are four ranges, namely: less than 10,000 bytes, less than 100,000 bytes, less than 1 megabyte, and greater than 1 megabyte. Each of the ranges 5 to 35, 35 to 65, and 65 to 95 are divided into four bands, one for each of the size ranges. The highest priority being given to the smallest size jobs. In this manner a system priority can be readily computed based upon the user priority and the size of the request. Additionally, certain destinations may be given higher priority weight than others and aging of the requests may be taken into account if the time of entry is recorded. These priority weightings are a matter of design choice.

As indicated in block 503, the request is entered in the appropriate destination queue by priority. The format for each destination queue entry is shown in FIG. 10. It will be apparent that the information in this entry contains the information that is found in the request queue depicted in FIG. 3 and a field for system priority, appointment ID, and state. The newly computed system priority will be entered in the first-named field. The appointment ID will be entered at a later time, and the state field will be used to indicate that this is the initial state.

After system priority has been computed, the new request is linked in the destination queue 206 in order of priority, as indicated in block 503. This queue comprises a separate linked list queue for each destination and the new request is entered in the proper list and in the proper place in a well-known fashion. As noted earlier, the manager module maintains an outbound request table 208 which contains an entry, depicted in FIG. 9, for each destination. Each entry includes a summary of all the service requests without appointments for the corresponding destination. The summary includes the highest priority of the service requests, the number of service requests, and the total number of bytes. This table is updated as indicated in block 505, after a new request has been entered in the destination queue. Thereafter, in block 509 the job routine signals the JM semaphore for the manager module 209 and the module returns to the EVENT WAIT state. The manager module uses a counting NJ semaphore which is incremented each time the semaphore is signaled to the manager module and which is decremented each time the job routine is entered. Thus, if other requests are in the FIFO request queue 202 they will be served when the job routine is again executed in response to the NJ semaphore.

SCHEDULABILITY ROUTINE

Figure 6:
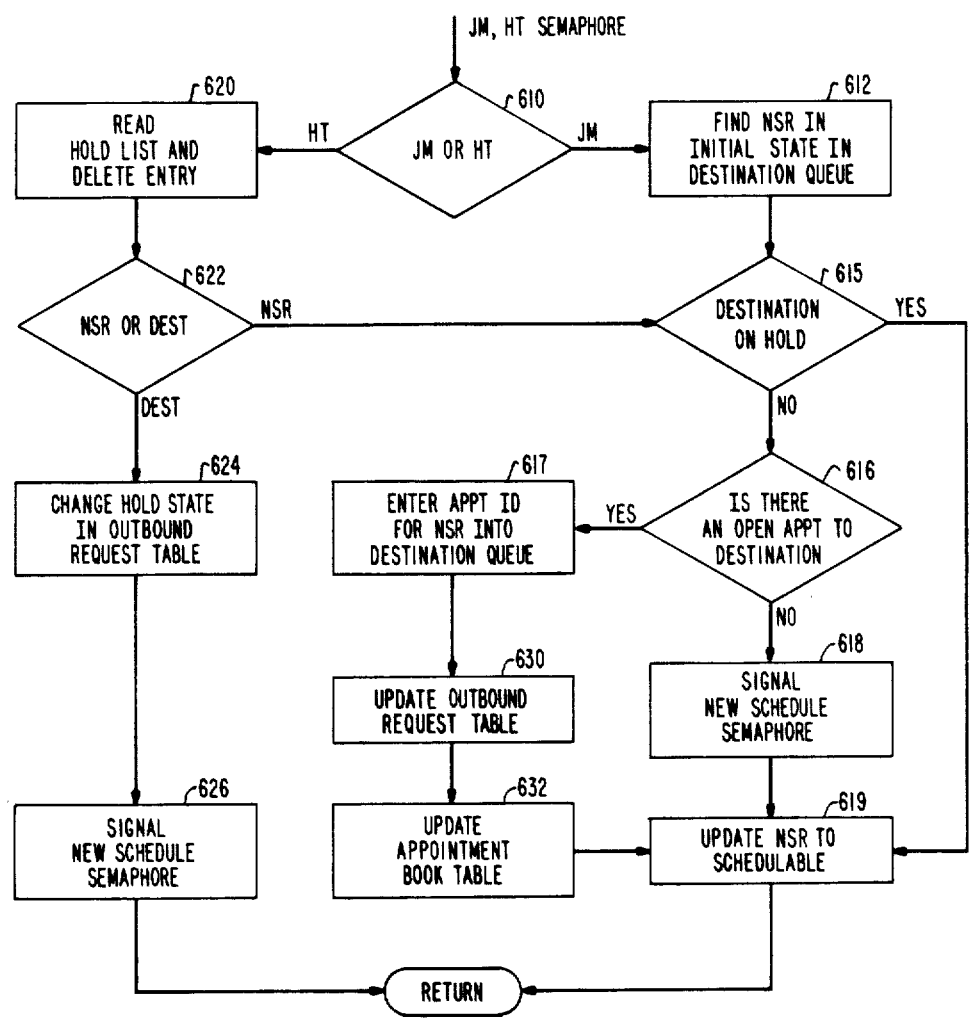

FIG. 6 is a flowchart showing the steps of the schedulability routine 420 of the manager module 209. This routine is entered when the JM semaphore is signaled by the new job routine or the HT semaphore is signaled. The HT semaphore is signaled when a time-out has occurred in the so-called "hold" list. The hold list is a linked list in memory 117 which is linked in order of a time indication, referred to as a time stamp, which occurs in each entry of the list. The format for an entry of this linked list is shown in FIG. 11. This list is used to delay action with respect to a certain destination or a certain service request by a period of time defined by the time stamp. The time stamp is generated at the time that an entry is made and is computed by adding a desired time period to the current system time. It is common in computer systems to define the current system time or time of day and the system will have a time-out routine which periodically compares the current system time with that indicated by the time stamp. When this routine tests the hold list, it will signal the HT semaphore when a time-out has occurred in this list. As indicated in FIG. 11, each entry of the hold linked list has a field indicating whether this is an NSR or a destination hold and fields indicating the identification of the NSR and the destination, in addition to the time stamp.

As indicated in decision block 610 of FIG. 6, a test is made in the schedulability routine to determine whether the routine has been activated in response to the JM or HT semaphore. In the case that it is due to the JM semaphore, the routine will look for a network service request in the destination queue in the initial state as indicated in block 612. From this, the identity of the destination will be obtained and, as indicated in decision block 615 a determination will be made as to whether this destination has been put on hold. This information may be obtained from the outbound request table entry for this destination. A typical entry for this table is shown in FIG. 9 and includes a field which indicates whether or not the destination has been put on hold. This may have occurred for various reasons such as the inability to reach the destination or a failure of the destination to accept requests for appointments. If the destination is on hold, a destination queue entry will be updated to the schedulable state as indicated in block 619. Thereafter, a return will be made to the EVENT WAIT state of the manager module.

If the destination is not on hold, a test is made in decision block 616 to determine if there is an open appointment to the destination under consideration. If so, this request will be added to that open appointment. Information about an open appointment is contained in the appointment book table 210. The format for an entry in this table is shown in FIG. 12. The table may be entered by searching for the destination in the peer node ID field of the table. If an entry is found for that destination, the open/closed field will be consulted to determine if the appointment is open. In the event that it is open, the appointment ID found in the appointment book table is entered in the destination queue entry for the network service request being handled. This action is reflected in block 617. Subsequently, the outbound request table, which represents a summary of all requests without appointment, must be updated to reflect the assignment of an appointment to this request. The entry format for this table is shown in FIG. 9. The update action is reflected by block 630 in FIG. 6.

In addition to updating the outbound request table, the appointment book table (FIG. 12) must be updated in its field reflecting the end time of the appointment, the priority level of service requests in the appointment and the total bytes. The information to update the priority and byte information is readily obtained from the destination queue entry (FIG. 10). The end time may be readily derived from the start time, the total number of bytes and the transmit speed available between the sending and receiving hosts. The transmit speed, which may differ for different destinations, is recorded for each destination in the outbound request table (FIG. 9). One commonly used transmission rate is 56,000 bits per second. For purposes of calculating intervals, a conservative rate of 4000 bytes per second (8 bits per byte) may be used on a 56,000 bits per second transmission facility to assure adequate time for transmission. Times for other data rate lines may be similarly calculated. In block 619 the state of the destination queue entry is changed to "schedulable" to indicate that the request is ready for data transfer. Returning to decision block 616, in the event that it is found that there is not an open destination, a new appointment will have to be made by means of the session scheduling routine 422 of the manager module. To activate this process, the new schedule semaphore is signaled in block 618 and the state of the entry in the destination queue is updated to schedulable as reflected in block 619.

Referring again to decision block 610 in FIG. 6, in the event that this routine is entered as a result of the hold timer semaphore HT, the hold link list is read and the first entry is taken from the list. A typical entry layout for the hold link list is shown in FIG. 11. As indicated in FIG. 6, if the HT semaphore is set, the schedulability routine reads the hold link list in block 620. The first entry is removed from the list and a test is made in decision block 622 to determine whether the item held is a service request (NSR) or a destination. This information is obtained from the NSR/DEST field shown in FIG. 11. In the event that it is a service request, a test is made in decision block 615 to determine if the destination corresponding to this service request is on hold. The destination ID for the NSR may be obtained from the destination queue entry (FIG. 10) and the hold information may be obtained from the outbound request table (FIG. 9). If the destination is on hold, the destination queue entry is updated to schedulable, as indicated in block 619. Otherwise, the same routine is followed as with the JM semaphore as discussed above with respect to blocks 616, 617, 618, 619, 630 and 632.

If it is determined by decision block 622 that the item on the link list was a destination, the hold state of the destination in the outbound request table (FIG. 9) is changed to release the destination, as indicated in block 624. Additionally, the new schedule semaphore will be signaled in block 618, to activate the session scheduling routine referred to in FIG. 4. Thereafter, a return is made to the EVENT WAIT state of the manager module.

SESSION SCHEDULING ROUTINE

Figure 16B:
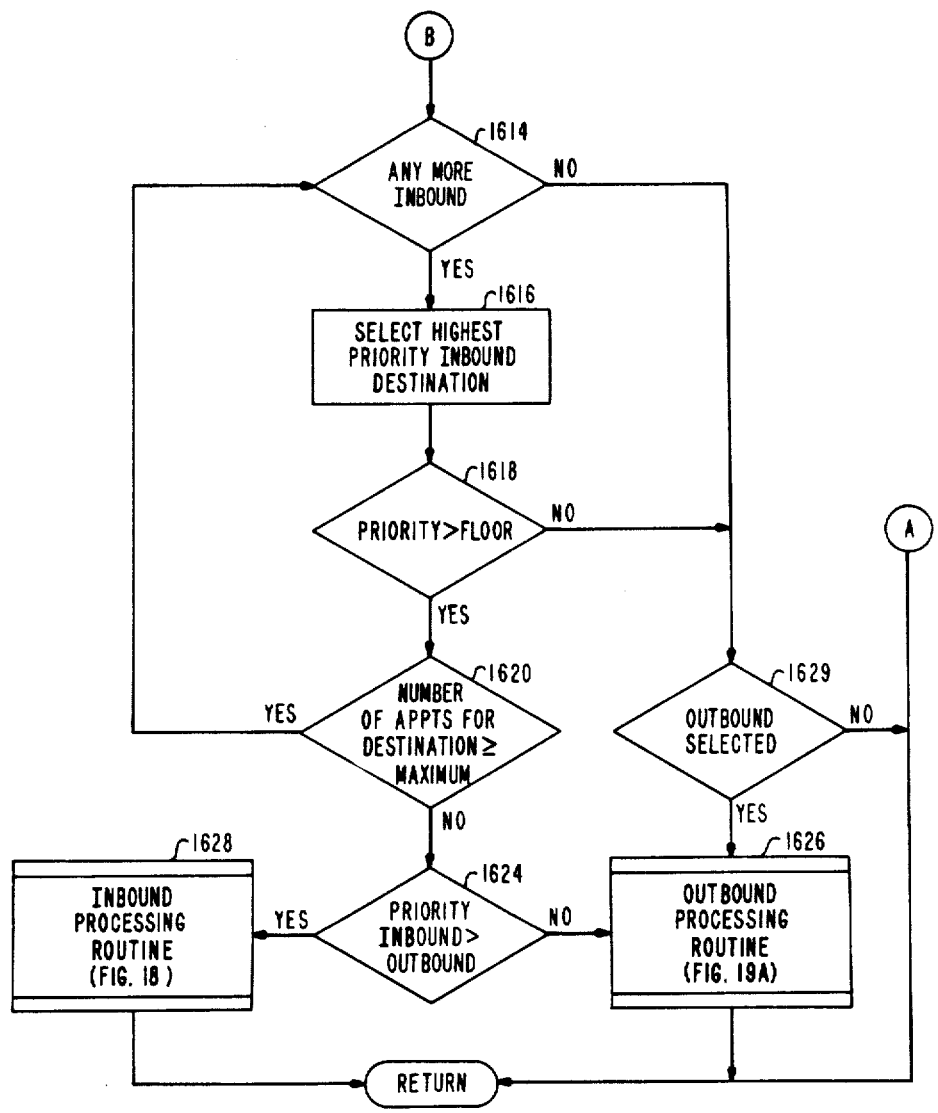

A flowchart representation of the session scheduling routine is depicted in FIGS. 16a and 16b. The first task, depicted in block 1601 is to compute the total number of appointments in the host system which are committed or reserved. This number is found by adding all the appointments found in the appointment book table 210. The computed total is compared to a predetermined maximum total for the system defined in the tuning value table shown in FIG. 13. As described earlier, the maximum number entered here is a function of system capacity and operational objectives. The comparison of the computed total with the maximum number is represented by decision block 1602. If the computed total is equal to or greater than the stated maximum, the routine will return to the EVENT WAIT state of the manager module. If the computed total is less than the maximum, the outbound request table (FIG. 9) is examined in block 1603 to determine if there are any outbound service requests without appointments. If there are none, a test is made in block 1614 to determine if there are any inbound requests.

Assuming that there are outbound requests without appointments, the highest priority outbound request will be selected, as indicated in block 1604. The entry format for the outbound request table is shown in FIG. 9, and includes a field which indicates the highest priority for any request without appointment to that destination and a state field indicating whether the destination is on hold. After a destination has been selected, a test is made in decision block 1606 to determine whether this destination is currently in the hold state. If so, the next highest priority outbound destination will be selected by repeating the functions of blocks 1603 and 1604. When a destination is found which is not held, a further test is made in block 1608 to determine whether the priority for the destination is greater than the priority floor. The priority floor is a predetermined value defined in the tuning value table (FIG. 13). This is an adjustable value which is set during manager module initialization and may be changed under control of an operator controlling system operations. As stated earlier, the purpose of the floor is to provide a lower limit of priorities and can be used to prevent the handling of low priority work during busy times. If the test in block 1608 shows that the highest priority for the destination selected in block 1604 is lower than the floor priority, the destination will be placed on the hold list for a period of time. The holding operation, depicted in block 1612, consists of entering a hold code in the hold state field of the outbound request table (See FIG. 9.) for the selected destination and entering the destination in the hold list (FIG. 11). This is a linked list, linked by time stamp and handled by a system time-out routine which signals the HT semaphore when a time-out has occurred as described earlier with reference to the schedulability routine shown in FIG. 6. The time stamp is computed by adding a desired time period, e.g., 5 minutes, to the current system time.

When a destination is found which meets the priority criterion, a further test is made in decision block 1610 to determine whether the number of appointments scheduled for the selected destination exceeds the maximum number allowable per destination. This information is also obtained from the tuning value table shown in FIG. 13. This is a preselected number chosen to prevent an excessive number of appointments from being scheduled to a particular destination while inhibiting appointments for other destinations. This number may be set to an initial value at time of initialization and modified as operational circumstances change. As stated earlier, an initial value for the maximum number of appointments in the system may, for example, be 20, and for the maximum number of appointments per destination may be three, depending on system requirements and objectives. If it is determined from the test in decision block 1610 that the number of appointments for the selected destination is equal to or greater than the maximum allowed, the destination will be held, as indicated in block 1612, and as described earlier.

If additional outbound requests are waiting after a priorly selected destination has been placed on hold, another destination will be selected from the outbound request table in blocks 1603 and 1604. If the selected destination passes all of the above-described tests of blocks 1606, 1608 and 1610, the inbound request table 212 is consulted in block 1614 (FIG. 16B). This table, an entry format for which is shown in FIG. 8, stores the identity of destinations for which a request for appointment was rejected. If the table is empty, a test is made in block 1629 to determine if an outbound destination was selected earlier in the process. If so, the outbound processing routine will be executed as indicated in block 1621. Otherwise, the session scheduling routine will return to the EVENT WAIT state of the manager module.

In the event that there are requests in the inbound request table, the highest priority inbound request is selected. This activity is reflected in block 1616. The inbound request table consists of a number of entries, one for each destination for which a request for appointment was rejected, linked in a linked list by priority. As shown in FIG. 8, each entry includes information as to the highest priority of work in the request and the total number of bytes for the request. When a destination has been selected from the inbound request table, a test is made in decision block 1618 to determine whether the priority for this destination is greater than the floor priority indicated in the tuning value table of FIG. 13. If the priority is below the floor priority, then the highest priority request in the inbound request table has a priority lower than the floor, indicating that there are no inbound requests to be processed. Accordingly, an advance is made to block 1629 to test whether an outbound request was selected, as discussed above.

If an inbound request having priority greater than the floor is found through the test of block 1618, a test is made in decision block 1620 to determine whether the number of appointments for this destination is equal to or greater than the allowable maximum number of appointments per destination. The number of existing appointments may be computed by examining the peer node ID field of each entry of the appointment book table 210. The maximum allowable is indicated in the tuning value table of FIG. 13. If it is greater than or equal to the maximum, an attempt will be made to select another destination; if not, a test is made in decision block 1624 to determine whether the priority for the selected inbound is greater than the priority for the selected outbound request. If the inbound request priority is greater or if no outbound request was selected, the system will execute the inbound processing routine, as shown in block 1628. Otherwise, the outbound processing routine will be executed, as indicated in block 1626. The inbound processing routine is described in further detail below with respect to FIG. 18. The routine for outbound processing is described in further detail below with respect to FIGS. 19A and 19B.

Figure 18:
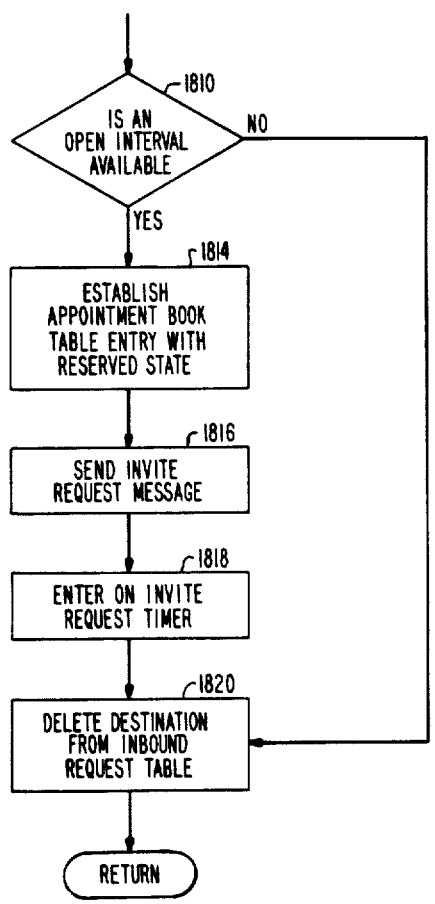

FIG. 18 is a flowchart representing the steps of the inbound processing routine of the session scheduling routine described above with respect to FIG. 16A and B. Prior to inbound processing, it will have been determined that a request was made from an identified location and recorded in the inbound request table 212, an entry of which is depicted in FIG. 8. A test is made in block 1810 to determine whether any open interval is available. Information about free intervals is available from the free interval list associated with the appointment book table 210. It is a linked list of free intervals for each transfer entity of the system, linked by interval starting time. The format for an entry of the list is shown in FIG. 7. An open interval is defined as an interval having a starting time without a defined terminating time period. If no such interval is found to be available by examination of the free interval list in block 1810, inbound processing is terminated.

Generally, there will be an open interval available for a transfer entity, following all reserved intervals of specified size. If none is available, the previously selected destination is deleted from the inbound request table as indicated in block 1820. Thereafter, a return is made to the EVENT WAIT state of manager module 209. In the event that an open interval is available, a new entry is established in the appointment book table 210, as indicated in block 1814. The entry format is shown in FIG. 12. The identity of the transfer entity (TE) for which the interval is available and the interval starting time, obtained from the free interval list, are recorded in the new entry. An appointment ID is generated by taking the current value of the system time of day clock and recording it in the new entry. Also the peer node ID, the priority level and the total number of bytes, which information is obtained from the inbound request table 212 (FIG. 8), are recorded in the appointment book table entry. Since this is an inbound request, a code indicating IN will be entered in the table. The state will be indicated as reserved.

From the total number of bytes supplied by the inbound request table 212 and the known byte transfer rate, the total time required for the interval can be readily computed. The transfer rate for each other node of the network may be recorded in a speed table. For convenience, this table has been combined with the outbound request table which has an entry for each other node of the network. If no speed table is used, a default speed representative of the slowest speed link in the network may be used to compute the required interval duration. With this interval information the interval end time can be computed and entered into the appointment book table entry. Additionally, this end time information may be used to update the free interval information for the identified transfer entity in the linked list of free intervals. This appointment would be marked as "closed" in the appointment book table entry. The "open" appointment is used only in special cases where it is anticipated that an undetermined number of files will be shipped to a specific location.

Subsequent to the establishing of the appointment book table entry, the invite request message will be sent, in the form of a datagram to the peer node whose ID was found initially in the inbound request table. This action is reflected in block 1816. The format for the invite request message is shown in FIG. 17 with other message formats. Block 1818 indicates that information, including the appointment ID, the destination, and a time stamp representing future time are entered in the invite timer list. The time stamp is chosen to cover a period of time sufficient to allow a distant node to respond to the invite request datagram, e.g., on the order of 4 minutes. The entry format for the invite request timer list is shown in FIG. 14. This is a linked list which is linked by time stamp and checked periodically, by the system time-out routine. If an entry times out, it will be removed from the list by the timer process 425 discussed later herein with respect to FIGS. 25A, 25B and 25C. After the entry on the invite timer list has been made, the entry for the destination, which is identified in the inbound request table, is removed from that table. This operation is depicted by block 1820. The invite request message will be interpreted by the receiving node as an invitation to negotiate an appointment and it will respond by sending a request appointment message. Alternatively, the contents of the inbound request table could be used to request the other node to send a file during the reserved appointment time, rather than to request an appointment.

Figure 19A:
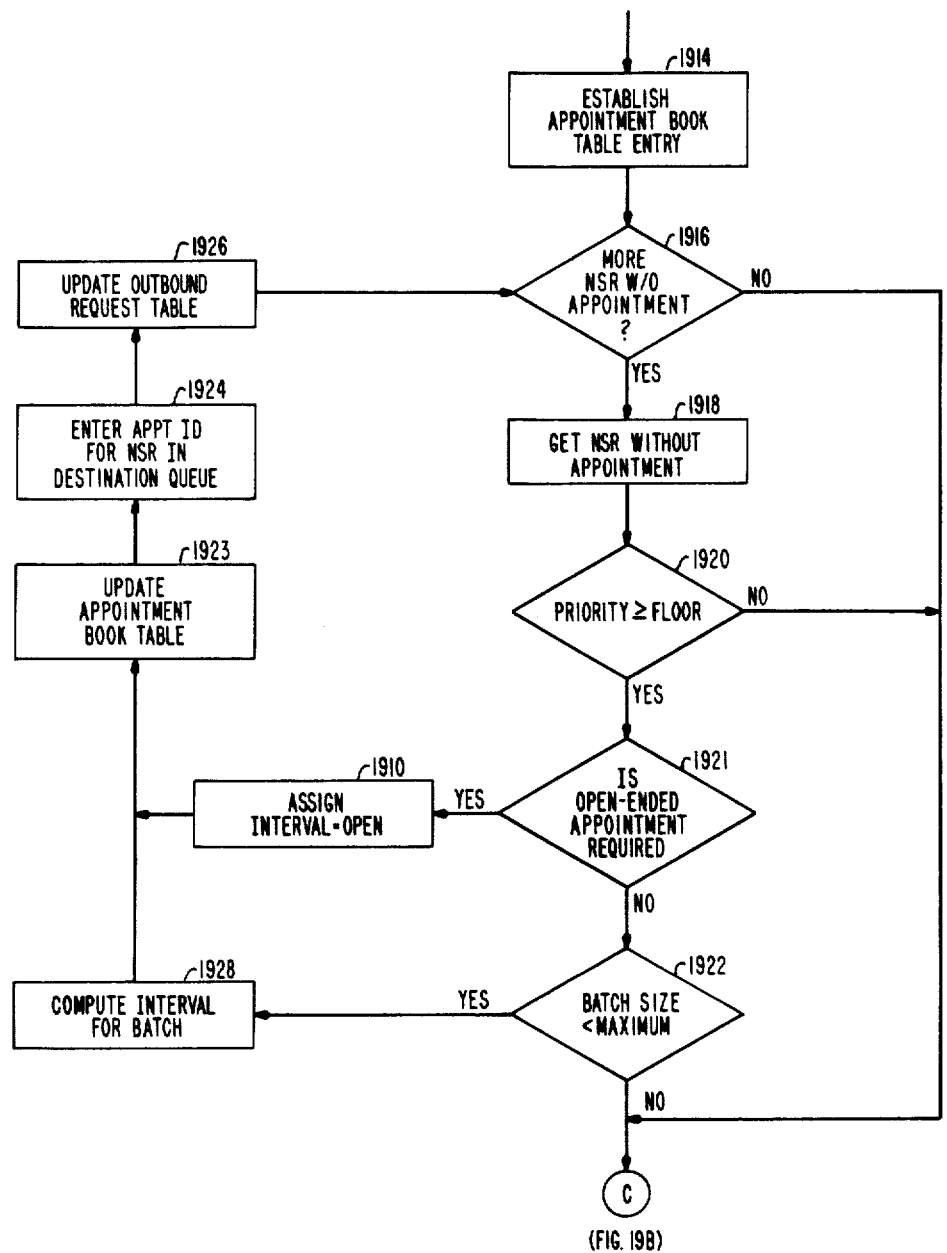
Figure 19B:
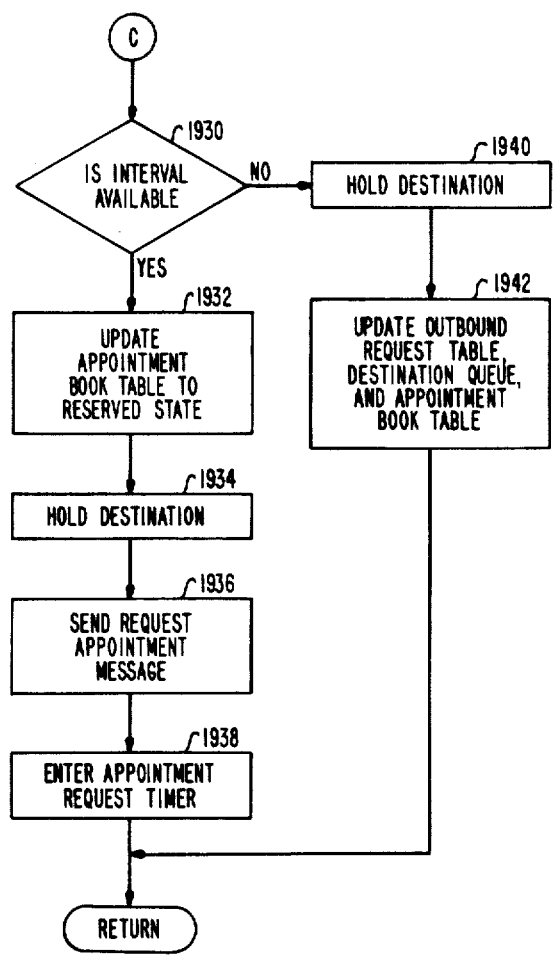

FIGS. 19A and 19B form a flowchart depicting the steps of the outbound processing routine, which is executed as part of the session scheduling routine described above with respect to FIGS. 16A and 16B. Prior to the execution of the outbound processing routine, a destination will have been selected for which there is an entry in the outbound request table 208. The first step in the outbound processing routine, as shown in block 1914, is to establish an entry in the appointment book table 210. This involves generating the appointment ID, described earlier, and entering the peer node ID, indicating that this is an outgoing appointment. Thereafter, as reflected in decision block 1916, a determination is made whether there are more requests to be handled. The number of requests is indicated in the outbound request table, as reflected in FIG. 9.

In the first pass through the decision block 1916, one would expect to find requests that need an appointment since this destination would not otherwise have been selected. Each time it is determined that more requests are present, the appropriate field containing the number of NSRs will be decremented in the outbound request table entry for this destination. In block 1918, the first request entry in the destination queue for this destination will be identified. The format for an entry in this queue is shown in FIG. 10. The system priority recorded therein is compared with the value of the priority floor recorded in the tuning value table shown in FIG. 13. There should be at least one service request with a priority greater than the floor for this destination, otherwise the destination would not have been selected.

When the priority is greater than the floor priority, a test is made in block 1921 to determine whether an open-ended appointment is required. The outbound request table, the entry format of which is shown in FIG. 9, contains a field reflecting this information. The open-ended appointment is reserved for certain destinations having very high traffic flow. The appointment essentially determines a starting time for the file transfer and the connection will remain established until all files for that destination, however many that may be at that time, have been transferred. If such an open-ended appointment is required, an open indication is entered in the appropriate field of the appointment book table entry, as indicated in block 1910.

If it is determined in block 1921 that an open-ended appointment is not required, a batch will be formed using the several service requests which are found in the destination queue 206 for this particular destination and which are also summarized in the outbound request table 208. After this decision has been made, the batch size, which is the size of the first request on the first pass through this block, is compared in block 1922 with the maximum allowable batch size recorded in the tuning value table. Assuming that it is less than the maximum batch size, the interval for the batch, based on the current batch size and the transmit speed for this destination recorded in the outbound request table is computed, as indicated in block 1928. Thereafter, this size information is recorded in the corresponding appointment book table entry, as indicated in block 1923. Subsequently, as indicated in block 1922, the service request is assigned to the appointment by marking the appointment ID priorly recorded in the appointment book table, in the appropriate field of the destination queue entry. Thereafter, the outbound request table is updated to reduce the number of service requests by 1, reduce the total number of bytes by the number of bytes of the service request in process, and the highest priority field may also have to be adjusted. This activity is represented by block 1926. Thereafter, the batching steps are repeated beginning with a determination in decision block 1916 to see if there are more requests without appointments. If there is none, an exit will be made to decision block 1930 in FIG. 19B. Exit to this decision block 1930 will also be made if it is found that the priority of the request being processed is less than the system's floor priority or if the batch size computed and tested in decision block 1922 is equal to or greater than the maximum batch size.

In decision block 1930 (FIG. 19B) a determination is made by examination of the free interval list associated with the appointment book table whether the desired interval is available. The free interval list contains an entry for each transfer entity (TE) and has recorded the starting and ending time of each free interval for that particular transfer entity. The list may also have a starting time for a free interval which does not have an end time, indicating that an open-ended interval is available. In decision block 1930, either an open-ended interval or an interval of the duration computed in block 1928 will be sought in the free interval list. If the desired interval is available, the appointment book entry, which was established in block 1914, will be updated to the reserved state. Furthermore, the identity of the transfer entity obtained from the free interval list and the start time and end time of the interval are recorded in the appointment book table. The free interval list, of course, must be updated each time a free interval is reserved. The state of the appointment book table entry is updated to the reserved state, as shown in block 1932. Subsequent to updating the appointment book table, the destination is temporarily put on hold by entering the destination identification on the hold list together with a time stamp of medium duration, for example, 4 minutes. This activity is reflected in block 1934.

As indicated in block 1936, the request appointment message is transmitted to the identified destination. This is a network datagram and the format for the message is shown together with other message formats in FIG. 17. As indicated in FIG. 17, the request appointment message includes the appointment ID, the start time, the end time, the total bytes, and the highest and lowest priority of the requests. All of this information is directly available in the appointment book table, the entry format of which is shown in. FIG. 12. As indicated in block 1938, an entry is made in the appointment request timer. This is a linked list linked by expiration time indicated by the time stamp, which is shown in the entry format of FIG. 15. The linked list is tested periodically by a system time-out routine which compares the time stamp with the current time of day and signals the timer semaphore when a time-out has occurred. The timer semaphore is used to activate the manager module and cause the execution of the timer routine 425. The time period selected when the entry is made on the request timer list indicated in block 1938 may be a relatively short time period, e.g., 1 or 2 minutes. This time period should be sufficient to allow the destination to receive the appointment request and return an acknowledge message. Upon completion of the work of block 1938, a return will be made to the EVENT WAIT state of the manager module.

In the event that it is determined in block 1930 that there is no interval available to handle the desired appointment, the destination will be held for a medium period of time, for example, 5 to 10 minutes to avoid immediate repeated attempts by the system to transfer the same set of files. This action is reflected in block 1940. Subsequent thereto, the destination queue, the outbound request table and the appointment book table must be updated to essentially undo the changes that were made in these tables due to the action in the blocks of FIG. 19A. Subsequent to action of block 1942, return will be made to the EVENT WAIT state of the manager module.

PROTOCOL RECEIVE ROUTINE

The protocol receive routine is part of the manager module and is activated in response to the protocol receive (PR) semaphore. This semaphore is signaled by the network software when a protocol message is received from another installation on the network. The network software passes the received protocol message to the module manager in a standard manner. The format of the messages which are transmitted between installations in connection with the appointment protocol are shown in FIG. 17. There are eight different messages, namely: request appointment, cancel appointment, accept appointment, reject appointment, invite request, request session, accept session and reject session. The basic steps of the protocol receive routine are depicted in FIGS. 20A through 20E, 21A and B, and 22. The protocol message is examined in block 2010 to determine message type. For each message type a different routine is executed.

In the case of the request appointment message, whereby another node requests an appointment from the node in which this process is being executed, a test will be made, indicated in decision block 2020 of FIG. 20A, to determine whether the identity of the other node may be found in the invite request timer linked list. The entry format for this timer is shown in FIG. 14. In the event that the destination is on the invite timer list, that entry will be cleared in block 2022. As discussed earlier with respect to the inbound processing routine of FIG. 18, an appointment is reserved when the destination is entered on the invite timer list. In this routine, in block 2024, this reservation is released by releasing the entry from the appointment book table (FIG. 12). In the event that it is found in the test of block 2020 that the identity of the requesting node is not in the invite request timer list, the blocks 2022 and 2024 are skipped and the routine advances directly to block 2026. Here a test is made to determine whether the total number of bytes as specified by the request appointment message is less than the maximum size of a request allowed for this system, as defined by the tuning value table, depicted in FIG. 13.

In the event that the total number of bytes for the request are greater than allowed, the total bytes of the request appointment message is adjusted to be equal to the maximum allowable, as reflected in block 2028. Next, in block 2030 a test is made to determine whether the low priority defined by the request message is greater or equal to floor priority, as defined by the tuning value table of FIG. 13. If not, the low priority value of the request appointment message is adjusted to be equal to the floor priority, as depicted in block 2032.

In block 2034 a test is made to determine whether an interval is available which meets the specified requirements. The period of time required for the appointment is determined from the total bytes and the transmission speed for that destination, as defined is the outbound request table (FIG. 9). The start time field and the end time field of the request appointment message specify the earliest starting time and the latest ending time. Thus, the requirements can be readily determined. The free interval list which lists free intervals for the host's transfer entities is examined in decision block 2034 and the earliest interval after the specified start time is selected; the message transmission time is added to that starting time to determine the message end time; a determination is made as to whether the end time is less than the end time for the interval from the free interval list and less than the end time specified by the request message. If the new end time falls within these limits, an interval is available and an appointment book entry is established as indicated in block 2036. An appointment ID is generated with reference to the current state of the system time clock, as discussed earlier herein. The appointment ID is entered in the appointment book table, together with the identity of the transfer entity (TE) obtained from the free interval list as well as the information available in the request message such as the peer appointment ID, the peer node ID, the high priority, the low priority, and the total bytes. In addition, the start time obtained from the free Interval list and the newly computed end time are also entered. Further entry will be made indicating that this is an incoming message and that this is a closed appointment. The state of the appointment book table entry will show that it is a committed appointment. Thereafter, as depicted in block 2038, the accept appointment message will be transmitted to the requesting node. The format for the accept appointment message is shown with the other message formats in FIG. 17. The information in the message will include the appointment ID in the source system transmitting the message and the peer appointment ID provided in the request message, as well as the committed start and end times and adjusted priority and adjusted size information obtainable from the appointment book table entry.

In the event that it is determined in block 2034 that an appropriate interval is not available, the reject appointment message, the format of which is shown in FIG. 17, is transmitted as indicated in block 2035. This message will have the peer appointment ID found in the corresponding request appointment message. Thereafter, the request is entered in the inbound request table 208 as depicted in block 2037. The format for entries in this table is shown in FIG. 8. This table is a linked list linked by peer node ID. The table entry includes the peer node ID, the highest priority of the request, and the total number of bytes, all obtained from the request appointment message. Upon completion of these actions, the program will return to the EVENT WAIT state of the manager module.

Referring again to FIG. 20A, in the event that the protocol message examined in block 2010 is the cancel appointment message, a previously established appointment must be canceled. This message may be received, for example, when another node encounters difficulty and an operator or some automated trouble handling routine sends the cancel appointment message. The format for the cancel appointment message is shown in FIG. 17 and includes the appointment ID which the installation receiving the message had previously assigned to the appointment. This identification provides an entry into the appointment book table 210. The appointment book entry for the appointment identified by the message will be deleted, thereby canceling the appointment as indicated in block 2040 of FIG. 20B. It will be understood that the free interval list associated with the appointment book table will also be updated concomitantly. The destination queue and the corresponding outbound request table entry will be updated to delete the appointment ID from each service request where it has been recorded, as indicated in block 2041. The signaling of the new schedule semaphore is indicated in block 2042, which will eventually cause execution of the session schedule routine discussed earlier with respect to FIGS. 16A and B.

Figure 20C:
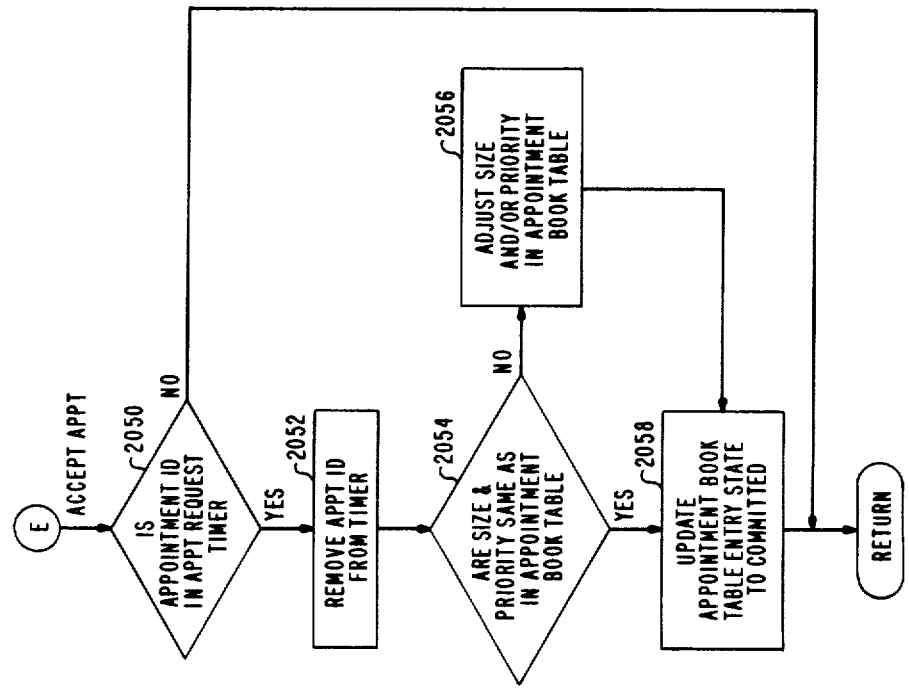
Figure 20B:
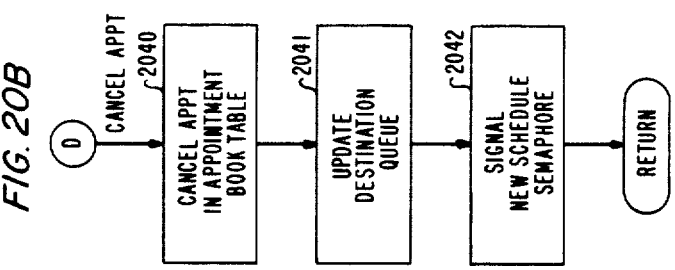

In the event that the examination of the protocol message in block 2010 of FIG. 20A indicates that the accept appointment message has been received, a determination is made in block 2050 of FIG. 20C as to whether a corresponding entry exists in the appointment request timer list. The entry format for this list is shown in FIG. 15. An entry will have been made in this list during outbound processing after the request appointment message has been transmitted, as discussed earlier with respect to FIG. 19B. The accept appointment message, the format of which is shown in FIG. 17, includes a peer appointment ID which is the appointment ID previously assigned by this installation in connection with the sending of a request appointment message. If this appointment ID is found in the appointment request timer list, it is deleted as depicted by block 2052. It is possible that the appointment ID is not found in the appointment request timer list since it may have been removed by expiration of the allotted time entered in the list. This is done by means of the timer routine 425 of the manager module, which effectively cancels the appointment as described later herein with respect to FIG. 25A. If the appointment ID is not in the timer list, the routine is terminated by returning to the EVENT WAIT state of the manager module.

A further test is made in decision block 2054 on the basis of the information received with the accept appointment message. The received peer appointment ID is used to access the appointment book table entry established by the outbound processing routine described with respect to FIGS. 19A and B. A comparison is made between the size and priority information in the entry of the appointment book table and the corresponding information received in the message. If the information is not the same, the new information obtained from the message will be stored in the appointment book table, as depicted by block 2056. Thereafter, in block 2058, the state of the appointment book entry is changed to the committed state. The program then returns to the EVENT WAIT state of the manager module of FIG. 4.

Figure 20D:
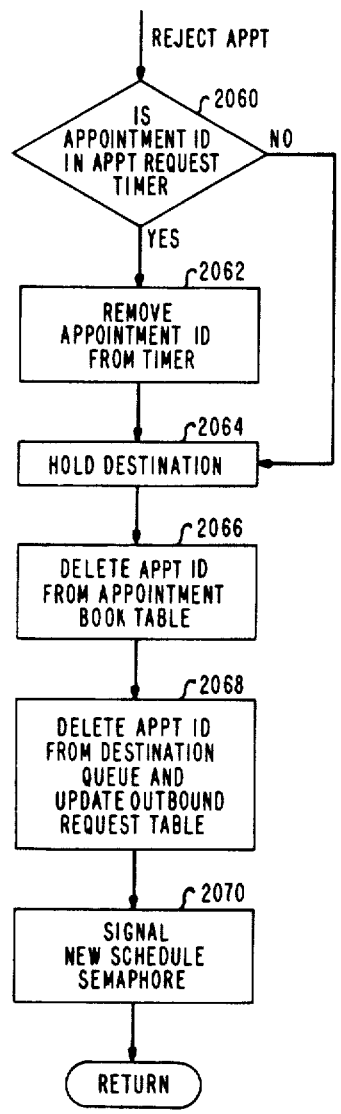

In the event that the received message examined in block 2010 of FIG. 20A is the reject appointment message, a determination is made in block 2060 of FIG. 20D to determine if the associated appointment ID is in the appointment request timer list. The entry format for this list is depicted in FIG. 15. The format of the reject appointment message is shown in FIG. 17. This message may be received after the request appointment message has been sent, as discussed previously with respect to the outbound processing routine. The reject message includes a peer appointment ID which was assigned during outbound processing and which was entered into the appointment request timer table at the time that the request appointment message was transmitted. If the appointment ID is found in the timer list, it is removed as indicated in block 2062. It is possible that the entry was priorly removed, due to the expiration of the time, by means of the timer routine 425 of the manager module, in which case block 2062 is bypassed. To avoid repeated processing of appointments to the same destination after a reject appointment message has been received, the destination is put on the hold list for a predetermined period of time which may be, for example, 5 or 10 minutes. The format for the hold list entry is shown in FIG. 11. This action is depicted in block 2064.

Another action to be taken in this routine is to delete the appointment ID from the appointment book, thereby releasing the appointment. The action of deleting the appointment from the appointment book table is depicted in block 2066. To remove the appointment completely, the appointment ID is also deleted from each entry in the destination queue for that destination and the corresponding entry in the outbound request table is updated accordingly. This action is noted in block 2068. The final action, depicted in block 2070, is to signal the new schedule semaphore to initiate scheduling by the session schedule routine 422 of the manager module of FIG. 4.

Figure 20E:
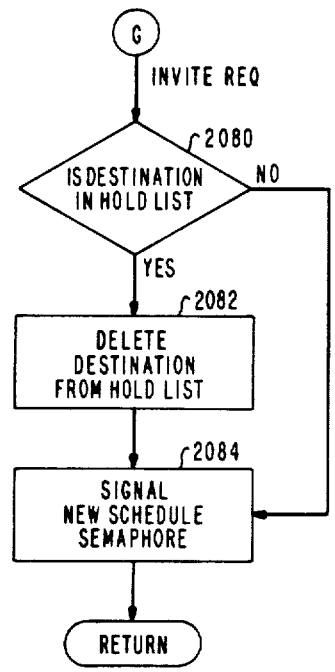

Referring again to FIG. 20A, in the event that the received message examined in block 2010 is the invite request message, a determination is made in block 2080 of FIG. 20E to ascertain whether the node from which the message has been received is currently on the hold list. The invite request message, the format for which is shown in FIG. 17, will usually be received after an earlier request has been rejected. Therefore, as discussed above, with respect to FIG. 20D, the destination will have been put on the hold list to be held for a predetermined period of time. The invite request message may come before or after that time has expired. In the event that the destination is on the hold list, it will be deleted by action in block 2082, otherwise the routine will advance directly to block 2082. The new schedule semaphore will be signaled in block 2084. Thereafter, return will be made to the EVENT WAIT state of the manager module of FIG. 4 where the new schedule semaphore will cause execution of the session schedule routine 422.

Figure 21A:
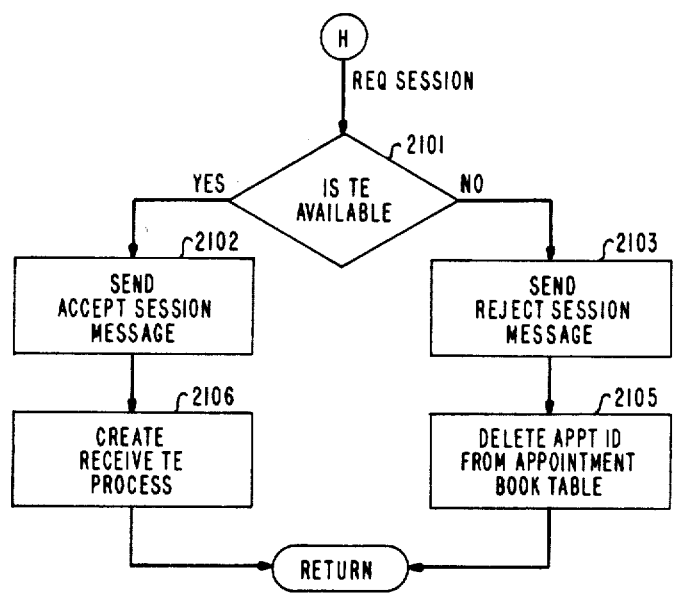

When, during the reading of the protocol message in block 2010 of FIG. 20A, it is determined that a request session message has been received, a test is made in decision block 2101, shown in FIG. 21A, to determine the availability of the previously reserved transfer entity. The format for the request session message is shown in FIG. 17. As indicated, this message includes the peer appointment ID. This is the appointment ID assigned by the node which requested the session. The session request will have been preceded by appointment negotiation and the received appointment ID will be found in the one of the appointment book table entries (FIG. 12) in the peer appointment ID field. From this appointment book table entry the identity of the transfer entity (TE ID) can be obtained. The test in block 2101 then is used to determine whether this transfer entity is available at this time. It is possible, due to system fault or unexpected delays that it is not available at this time. In case it is not, a reject session message is transmitted to the node which requested the session, as depicted in block 2103. The reject session message, when it is sent will include the peer appointment ID, as depicted in FIG. 17, which is the same ID which was received with the request session message. After the reject session message has been transmitted, the corresponding appointment book table entry is deleted, canceling the appointment, as indicated in block 2105. In a sophisticated system, the reject session message may include a reason code which defines the reason for the rejection allowing the receiving side to make a determination as to when it should renegotiate the appointment. In the absence of such a reason code, renegotiation of an appointment may be attempted after some predetermined period of time, e.g., 5 to 10 minutes.

In the event that it is determined in decision block 2101 of FIG. 21A that the transfer entity is available, the accept session message is transmitted to the requesting node as represented by block 2102. This message will include the peer appointment ID received with the request session message as well as the ID of the available transfer entity. In block 2106, a program call is made to the part of the system which handles file transfers to initiate a transfer entity process. As discussed earlier herein, the transfer entity is equivalent to a port which forms an interface between the appointment protocol user process, e.g., the manager module, and the network. Facilities of this type are well known in the industry and are commonly used in intercomputer communications. In block 2106 the protocol receive routine provides the identity of the transfer entity to be used and a process will be created for the identified transfer entity. Thereafter a return will be made to the EVENT WAIT state of the manager module.

Figure 21B:
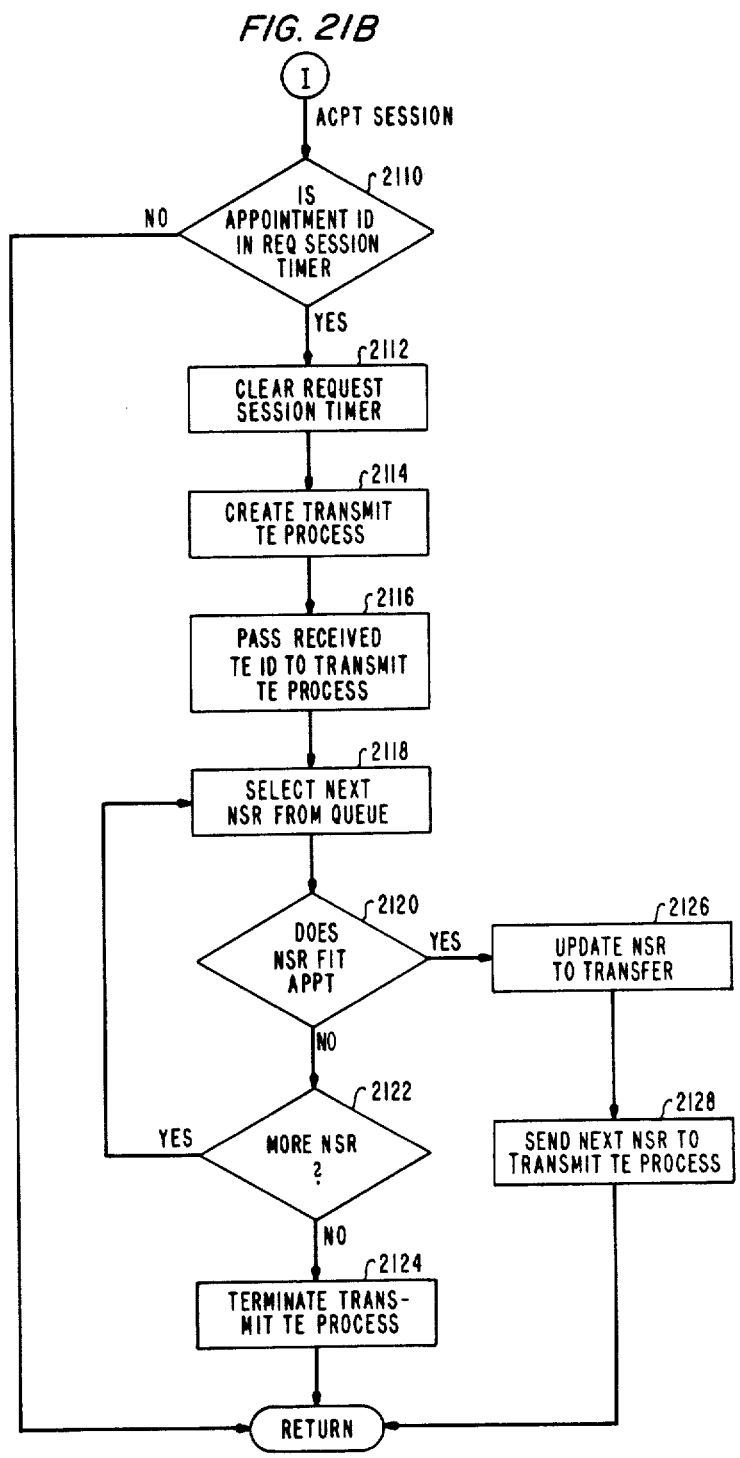

When it is determined in block 2010 of the protocol receive routine in FIG. 20A, that the received message is the accept session message, a test is made in decision block 2110 of FIG. 21B to determine whether the appointment ID identified by the message is found in the request session timer table. If it is not found, a return is made to the EVENT WAIT state of the manager module. If it is found, the corresponding entry is cleared from this table as represented by block 2112. The format for the accept session message is shown in FIG. 17. The session request timer table layout is shown in FIG. 23. An entry will have been made in this table at the time that a request session message was sent by the system. In the event that the specified time elapses before the accept session message is received, the request session timer table will be cleared.

After the timer table has been cleared in block 2112 a program call is made to the file handling software of the system to create a transfer entity process in a well-known manner, as indicated in block 2114. The transfer entity identity (TE ID) received with the accept session message (FIG. 17) is passed to the TE process in block 2116. In block 2118 the destination queue for the destination under consideration is examined and the first request in the queue is selected. Subsequently, a test is made in block 2120 to determine whether the request will fit in the allocated session. The size of the request is available in the destination queue (FIG. 10) and the size of the session is determined from the start and end times found in the appointment book table (FIG. 12). If it is determined that the request does not fit the session, a further decision is made to determine whether more NSRs are available in the queue as indicated in block 2122. If none is available, the TE process will be terminated as indicated in block 2124. Assuming that the request does fit, the state of the request in the destination queue (FIG. 10) is updated to "transfer" as indicated in block 2126. Furthermore, the service request information, which includes identity and location of the file to be transferred, is passed to the TE Process in block 2128. Thereafter, a return is made to the manager module EVENT WAIT state.

Figure 22:
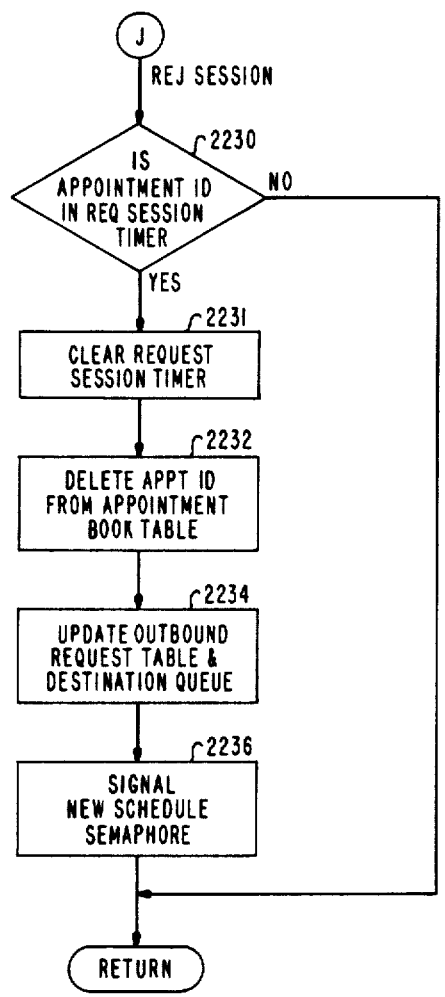

If it is determined during the examination of the protocol message in block 2010 (FIG. 20A) of the protocol receive process, that a reject session message has been received, a test is made in block 2230 (FIG. 22) to determine if the corresponding appointment ID is found in the request session timer list (FIG. 23). If it is not found, a return is made to the manager module EVENT WAIT state. Otherwise, the corresponding entry is cleared from the table as indicated by block 2231. The reject session message, the format for which is shown in FIG. 17, includes a peer appointment ID. This is the ID earlier assigned by the installation which is now receiving the reject message. Using the ID, the corresponding appointment book table entry (FIG. 12) is deleted as indicated in block 2232 and the free interval list is updated. Furthermore, the corresponding destination queue and the outbound request table are updated, as indicated in block 2234, to reflect the fact that this service request is no longer scheduled and requires a new appointment. Consequently, the new schedule semaphore is signaled as indicated in block 2236 to cause the manager module to reinitialize appointment scheduling. Thereafter, a return is made to the manager module EVENT WAIT state.

TE PROCESSING ROUTINE

As shown in FIG. 4, the TE processing routine 423 is entered in response to the TE semaphore. This routine is outlined further in FIG. 24. The semaphore is generated by the TE process, described below with respect to FIG. 26. This process communicates with other layers of the network to accomplish the actual file transfer and generates the TE semaphore together with a message indicating the reason for the semaphore. The semaphore may be generated each time a network service request (NSR) is completed and when the TE session is terminated. This termination may be either because all the work has been completed or because a network problem has been encountered. The semaphore message is read, as indicated in block 2402 of FIG. 24, and in the event that the message indicates completion of the network service request, the service request is deleted from the destination queue as indicated in block 2404. Thereafter, as indicated in block 2406, the appointment book table is updated and the number of bytes of the completed network service request is subtracted from the total number of bytes recorded in the table.

Next, an inquiry is made as indicated by decision block 2408 to determine if there are more requests to be handled for this session. This is determined by checking the appointment ID found in the destination queue entry (FIG. 10). If so, a further test is made as indicated in block 2410 to determine if the next service request will fit the current session. Information about the session length is found in the corresponding appointment book table (FIG. 12) which includes the ending time. Thus, by examining the number of bytes for the next request, as obtained from the destination queue and the transmission speed recorded in the outbound request table (FIG. 9), it can be determined whether the next service request will fit in the session. If it does, the identity of the next service request is passed to the TE process, as indicated in block 2412. Thereafter, a return is made to the EVENT WAIT state of the manager module of FIG. 4. In the event that it is determined that no further requests remain to be serviced in decision block 2408, or if it is determined that the next service request does not fit in the session, a "terminate" message is sent to the TE process as indicated in block 2414. Thereafter, return is made to the EVENT WAIT state.

In the event that it is determined in the reading of the TE message in block 2402 that the semaphore was sent in connection with the session termination, the appointment is canceled by deleting the appointment book table entry identified by the TE ID, and deleting the appointment ID from the destination queue. It will be understood that the outbound request table and appointment book free interval list will also be updated to reflect cancellation of the appointment. These actions are indicated in block 2420 in block 2421 a message is sent to the network interface programs to bill the TE process. In block 2422 it is indicated that the new schedule semaphore is signaled to enable a manager module to reinitialize schedulability processing. Thereafter, a return is made in the manner mentioned above.

TIMER PROCESSING ROUTINE

FIG. 25 shows in greater detail the logic of the timer routine 425 of the manager module of FIG. 4. This routine is activated in response to the timer semaphore. A computer system will include a time-out routine which periodically tests the state of items which are identified to the timer routine by various programs of the system. The items identified in this illustrative embodiment include the invite request timer table (FIG. 14), the appointment request timer table (FIG. 15), the request session timer table (FIG. 23), and the appointment book table (FIG. 12). In the first three of these, an entry identified as "time stamp" indicates the future time at which a time-out is to occur. The appointment book table includes a "start time" which indicates the time at which the time-out is to occur.

When time-out has occurred on any of these four, the timer semaphore will be set by the common time-out routine accompanied by an indication as to the item in which the time-out occurred and, where necessary, the identity of the entry in which it occurred. The timer routine of FIG. 25, in block 2501, responds to the timer semaphore and analyzes the accompanying data. In the event that time-out has occurred in the invite request timer table, this is an indication that another computer installation has been invited to send a request but has not responded within the desired time. Consequently, the corresponding entry is deleted from the invite request timer table as indicated in block 2502 and the appointment book table entry which was reserved earlier is also cleared, as indicated in block 2504. To cause the system to do further scheduling, the new schedule semaphore is set as indicated in block 2506.

If it is determined in block 2501 that the time-out occurred in the appointment request timer table, it is taken as an indication that an appointment has been requested from a distant node but the distant node has neither accepted nor rejected the appointment within the desired period of time. Consequently, the corresponding entry in this table is deleted as indicated in block 2510. Furthermore, it is assumed that a response was not received from the other node due to some difficulty. Accordingly, the destination is placed on the hold list (FIG. 11) for a medium period of time e.g., 5 to 10 minutes, to avoid making repeated appointment requests to this destination. Furthermore, the appointment which was reserved earlier is dropped. This is accomplished by deleting the appointment ID from the destination queue entries bearing the appointment ID. The appropriate appointment ID, of course, is found in the appointment request timer table as shown in FIG. 15. Similarly, the appointment is deleted from the appointment book table (FIG. 12) and the corresponding free interval list (FIG. 7) will also be updated to reflect the availability of the priorly reserved time period. This is indicated in block 2514. In block 2516 the new schedule semaphore is signaled to initiate further schedulability processing. A return is made to the EVENT WAIT state.

Figure 25B:
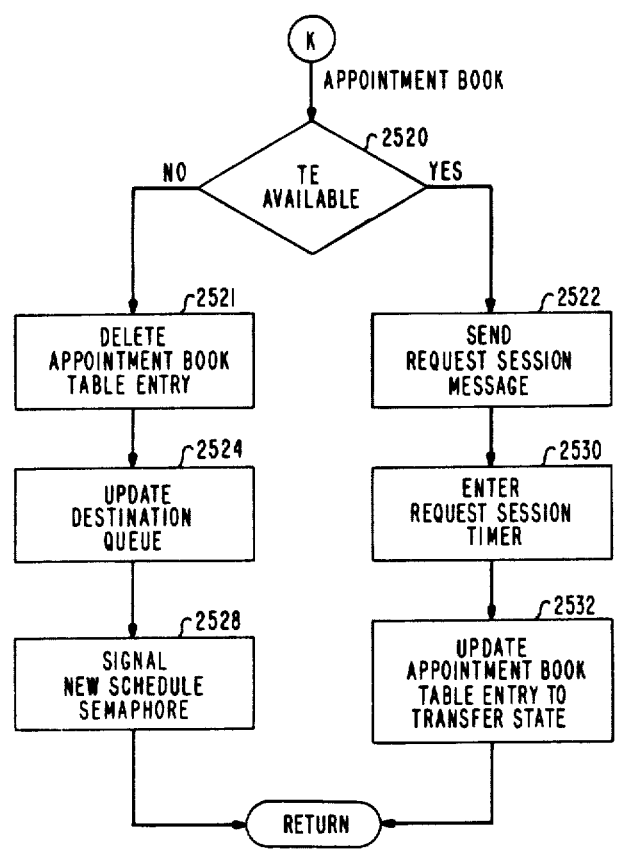
Figure 25C:
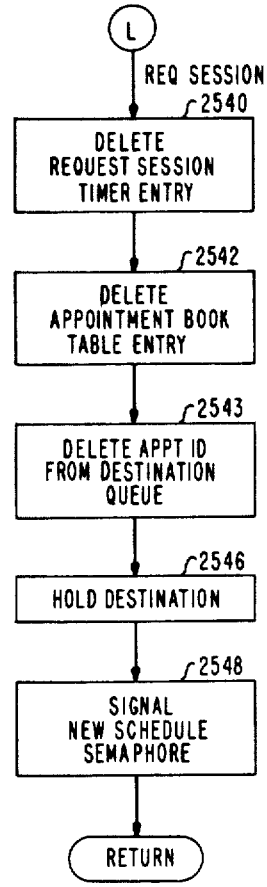

In the event that it is determined, by the reading of block 2501 in FIG. 25A that the time-out has occurred in the appointment book table, a test is made in decision block 2520 of FIG. 25B to find whether the designated transfer entity (TE) is still available. Information concerning the identity of the TE is found in the identified appointment book table entry. If it is found that the TE is not available, it is assumed that an unforeseen or unscheduled action has taken place and the appointment is canceled by deleting the entry from the appointment book table in a manner discussed earlier and as indicated in block 2521. Furthermore, the destination queue is updated to reflect the canceled appointment as indicated in block 2524. A new appointment should be sought for the service requests recorded in this queue. Accordingly, the new schedule semaphore is signaled as indicated in block 2528.

If it is determined in block 2520 of FIG. 25B that the TE is available, the request session message is transmitted to the peer node, as indicated in block 2522. The format of the request session message is indicated in FIG. 17 and includes the appointment ID of this appointment in the node which sends the message. This will serve as appropriate identification for later communications between the two nodes. As described earlier, such messages may be simply datagrams in the computer network. Also, an entry is made in request session timer table (FIG. 23) using a time stamp of medium duration, e.g., 5 minutes, as reflected by block 2530. As discussed elsewhere, this table will be cleared at a future time when either the session is established or a time-out occurs before a response is received from the peer node. One additional step in this chain of actions related to requesting a session, is to update the appointment book table (FIG. 12) to indicate that this appointment is in the "transfer" state as shown in block 2532. Thereafter, a return is made to the manager module EVENT WAIT state.

If in reading the timer semaphore data in block 2501, it is determined that the time-out occurred in the request session timer table (FIG. 23) it is taken as an indication that a session was requested but could not be handled by the other node. Consequently, the corresponding entry is deleted from this table as indicated in block 2540 of FIG. 25C. The appointment is also deleted from the appointment book table in the manner indicated before, and as reflected in block 2542. Furthermore, the appointment ID is deleted from the destination queue and the outbound request table is updated as indicated block 2543. The failure to honor a session request indicates that some difficulty may have been encountered at the peer node or in the network. Consequently, the destination is held, by means of the hold list (FIG. 11) for a medium period of time e.g., 5 minutes. Thereafter, the new schedule semaphore is signaled as indicated in block 2548 and return is made to the EVENT WAIT state.

TRANSFER ENTITY (TE) PROCESS

Figure 26:
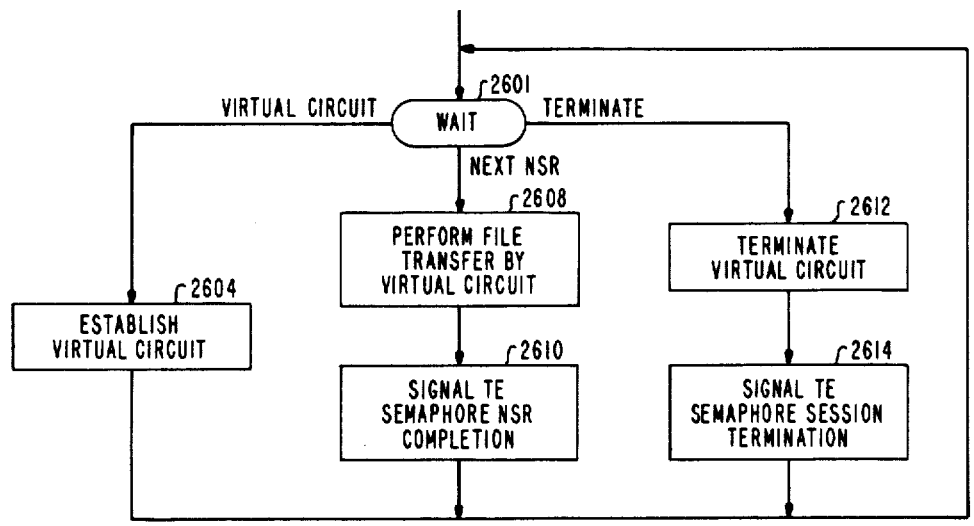
FIGS. 26 and 27 are flowchart representations of TE processes.

The logic for the TE process in case of outbound data transfers is shown in FIG. 26. This figure shows in flowchart form step taken by the TE process and interaction with the manager module. The process until activated, will remain in the wait state, identified by block 2601. The process is activated in response to a create message from the manager module protocol receive routine when the accept session message is received (FIG. 21B). At that time the identity of the host TE and the identity of the destination TE are passed to the TE process, and the process will establish a virtual circuit through interaction with other network software. Since most computer systems are capable of handling several transfers at one time, the system will normally be adapted to have several TE processes activated at the same time controlling different file transfers to various destinations. The establishment of the virtual circuit is indicated in block 2604. This is a well-known function referred to earlier herein. Once the virtual circuit has been established, the TE process waits for a further command. Two commands are possible, namely, "next NSR" and "terminate". The first command refers to the service request to be handled as specified in the destination queue and will be accompanied by appropriate identification of the request. Once this command has been received, the actual file transfer will be performed using the file description information found in the destination queue and the priorly established virtual circuit, as indicated in block 2608. When the designated file has been transferred, the TE process signals the TE semaphore "NSR completion" in block 2610 and returns to block 2601 to wait for a further command.

In the event that the "terminate" command is received in block 2606, any virtual circuit which may have been established in block 2608 will be terminated, again using techniques well known in the art. This action is reflected in block 2612. The next step is to signal the TE semaphore for "termination" as indicated in block 2614. Thereafter, a return is made to the wait state of the TE process, block 2601.

Figure 27:
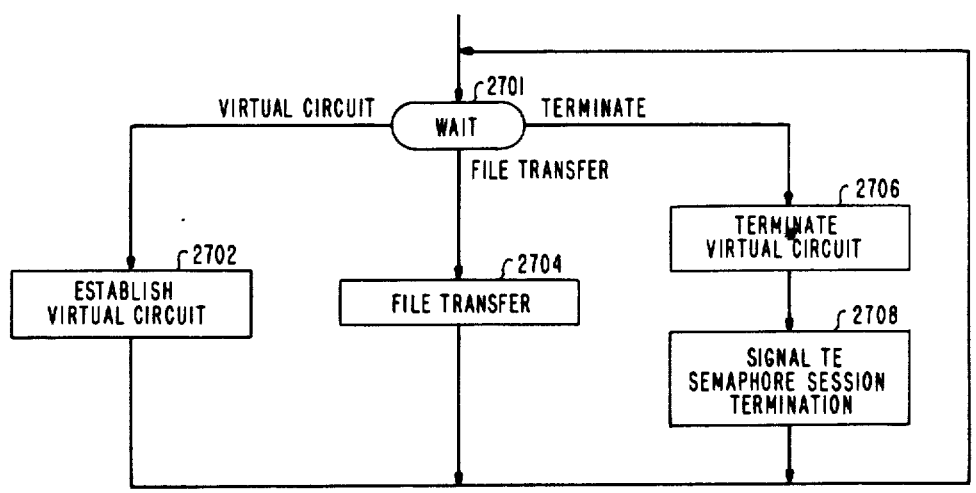

The logic for the TE process in case of an inbound data transfer is shown in FIG. 27. The figure shows in flow chart form the steps taken by the TE process and interaction with the manager module. The process until activated will remain in the wait state 2701. It is activated in response to a create message from the manager module protocol receive routine when the request session message is received (FIG. 21A). The available TE identity information will be passed to the process and through normal network protocol with the transmitting node, a virtual circuit will be established as indicated in block 2702. The transfer of files will be controlled from the transmitting node and the TE process will perform the normal file transfer functions as files are received, as indicated in block 2704. When a file transfer has been completed, the receive TE process will receive a terminate message which will terminate the receiving end of the virtual circuit as indicated in block 2706 and signal the TE semaphore with a termination message as indicated in block 2708. The TE semaphore will activate the TE processing routine of the manager module as discussed earlier with respect to FIG. 24. The wait state 2701 will include a time-out routine as a self-defense timer, which causes the TE process to terminate in the event no communication is received from the transmitting node for a predetermined period of time, e.g., 5 minutes.

It will be understood that numerous changes and modifications may be made to this illustrative embodiment by persons skilled in the art. For example, it will be apparent that a number of embellishments may be added to the system which would provide a greater degree of control, such as more complex messages and protocol which would state reasons for nonacceptance of appointments including expected time of delay, etc. Furthermore, it will be understood that normal error checking and other known protocols may be added to the described system to enhance its reliability. Similarly, fault detection and recovery techniques may be added in a standard and wellknown fashion. Additionally, as a matter of design choice some of the routines such as the job handling routine and others may be made into independent processes which would communicate with the manager module. Certain of the protocol messages may be simplified or not used at all in order to simplify the communications between computer installations. These and other changes and modifications can be made without departing from the spirit and scope of this invention and it is intended that all such changes and modifications be covered by the following claims.

What is claimed is:

1. A computer including a data transfer arrangement for transferring data files to designated destinations comprising:

file transfer means for transmitting data files to said destinations;

appointment book table means containing data defining a future time for availability of said file transfer means;

means connected to said appointment book table means for extracting said future time data from said appointment book table means and for transmitting an appointment message defining said future time to a selected one of said destinations;

timing means connected to said appointment book table means for defining current time and for generating a time-out signal when the current time equals said future time; and means connected to said timing means and said file transfer means and responsive to said time-out signal to activate said file transfer means to transmit a specified data file to said selected destination;

whereby said file transfer means is enabled to transmit a specified data file at the priorly defined future time.

2. The computer in accordance with claim 1 and further comprising a file transfer queue connected to said file transfer means for storing data identifying files in order of priority assigned to the files; and wherein said file transfer means is activated to transfer a plurality of files to said selected destination in the sequence in which they are stored in said queue.

3. The computer in accordance with claim 1 and further comprising a request queue for storing data defining data files and data defining destinations to which the data files are to be transmitted, a plurality of destination queues connected to said file transfer means, one for each destination to which a file may be transmitted, and means for transferring said data defining data files from said request queue to said plurality of destination queues as defined by said data defining destinations and for ordering said data defining data files within each destination queus in order of priority assigned to each data file.

4. The computer in accordance with claim 3 and further comprising an outbound request table and wherein each entry of each of said destination queues contains an entry defining an appointment identification and said outbound request table contains a summary of all destination queue entries to which no appointment has been assigned.

5. The computer in accordance with claim 1 wherein said file transfer means comprises a plurality of individual transfer entities adapted to operate simultaneously to transfer data files to different destinations.

6. The computer in accordance with claim 5 wherein said appointment book table comprises a plurality of entries and further comprising means for storing a free interval list for recording data identifying time periods during which a transfer entity is available for use; and means for selecting a free interval from said free interval list and entering data defining said selected interval in an entry of said appointment book table means.

7. The data transfer arrangement in accordance with claim 6 and further comprising means for generating a unique appointment identification number and for entering said unique identification number in said entry of said appointment book table means.

8. A data transfer arrangement for transferring data files between interconnected data processing stations comprising:

means in one of said stations for transmitting to another of said stations an appointment request message defining a future time for file transfer;

means in said other station responsive to said appointment request message to send an acknowledge message to said one station;

timer means for defining current time and for generating time-out signals when a defined future time equals the current time; and means in said one station responsive to said time-out signals and said acknowledge message to transmit a data file to said other station.

9. A computer for connection to other computers comprising:

means for receiving and storing files in an inbound request table means;

means for receiving data messages from said other computers and responsive to a message from one of said other computers requiring file transfer from said one of said other computers for entering data identifying said one computer in said inbound request table means; and means for reading said table means and for transmitting to said one computer a message inviting file transfer.

10. A computer system for connection to a network for interconnecting a plurality of computers, and including data transfer scheduling means comprising:

means for transmitting on said network an appointment message addressed to a designated other computer defining a future starting time for the transfer of a data file;

timer means for generating a time-out signal when current time equals said future starting time; and data transfer means responsive to said time-out signal to establish a virtual circuit through said network to said other computer and to transfer said data file to said other computer.

11. The computer system in accordance with claim 10 and further comprising means for receiving an acknowledge message and means for inhibiting said data transfer means if an acknowledge message is not received within a predetermined period of time after transmission of said appointment message.

12. The computer system in accordance with claim 11 and further comprising means for receiving an appointment message and means for transmitting an acknowledge message in response to said appointment message.

13. In a computer system, the method for controlling transfer of a data file from a source computer to a designated destination computer comprises the steps of:

A. generating and recording data defining a future file transfer start time for the transfer of said file;

B. transmitting an appointment data message to said designated destination including said data defining said start time; and C. initiating transmission of said data file to said destination at said file transfer start time defined by said recorded data.

14. The method in accordance with claim 13 further comprising the step of transmitting an acknowledge message from said destination to said source computer upon receipt of said appointment message and the step of canceling said recorded file transfer start time in the event that said acknowledge message is not received at said source location within a predetermined period of time after said appointment message, to prevent said initiation of transmission of said data file.

15. In a computer system having a plurality of interconnected computers and data file transfer means in each of said computers, the method of transferring data files in response to transfer requests identifying data files to be transferred from a source location to a designated destination, comprising the steps of:

A. assigning a priority value to each request;

B. arranging pending requests for each destination in order of priority;

C. selecting a destination having at least one request for priority not less than the priority value of all other pending requests;

D. reserving a period of future time for said data transfer arrangement for the transfer of files to said selected destination;

E. sending an appointment message to said selected destination defining said period of future time; and F. transmitting said files to said selected destination in said reserved period of future time.

16. The method in accordance with claim 15 further comprising the step of transmitting an acknowledge message to said source location upon receipt of said appointment message at said selected destination and the step of canceling said step of transmitting if said acknowledge message is not received at said source location within a predetermined period of time.

17. The method in accordance with claim 16 wherein said appointment message sent to said selected destination includes information defining the highest and the lowest priority of data files to be transferred and comprising a further step of comparing priority information upon receipt of said appointment message at said selected destination with a predetermined minimum floor priority and including in said acknowledge message an indication of minimum acceptable priority.

18. The method in accordance with claim 16 wherein said step of transmitting an acknowledge message includes incorporating acceptable file size information in said acknowledge message and comprising the step of selecting a period of time within said reserved period of future time sufficient to receive a file of the size defined by said size information and including in said acknowledge message the starting time of said selected period.

19. The method in accordance with claim 15 and further comprising, upon receipt of said appointment message, the step of computing the total number of appointments reserved at said selected destination, comparing said computed total with a predetermined maximum allowable total, and sending reject message to said source location indicating rejection of appointment when said computer total exceeds said maximum allowable total.

20. The method in accordance with claim 19 further comprising the steps of recording the identity of the source location upon the sending of said reject message, periodically computing the total number of appointments, comparing said computed total with said allowable maximum, and sending an invite appointment request message to said source location when said computed total is less than said allowable maximum, inviting said source to request an appointment.

21. The method in accordance with claim 15 and further comprising, upon receipt of said appointment message the step of computing the total number of appointments reserved at said selected destination for data transfers between said source and said selected destination, comparing said computed total with a predetermined maximum allowable total, and sending a reject message to said source location indicating rejection of appointment when said computed total exceeds said maximum allowable total.

22. The method in accordance with claim 21 further comprising the steps of recording the identity of the source location upon sending of said reject message, periodically computing the total number of appointments, comparing said computed total with said allowable maximum, and sending an invite appointment request message to said source location when said computed total is less than said allowable maximum, inviting said source to request an appointment.

23. A data processing system comprising:
means for receiving data files;
means for recording identity of a computer which has attempted to transfer data and which transfer could not be completed due to unavailability of said means for receiving data files; and
means to transmit an invite message to said computer when said means for receiving is available to receive a data file, whereby said computer is invited to initiate data transfer procedures.

24. A computer system including a data transfer arrangement for transferring data files to other computers, comprising means for transmitting an appointment message to one of said other computers defining a future start time for file transfer;
timer means for generating time-out signals when a defined future start time has occurred; and
means responsive to a time-out signal indicating that said defined future start time has occurred to transmit a data file to said one of said other computers.

25. In a data transfer system, the method of scheduling the transfer of data files between computers comprising the steps of:

A. recording request for transfer of data files from one computer to other computers;

B. recording a priority level designation for each request;

C. recording the identity of other computers having made unsuccessful attempts to transfer data files to said one computer, together with a priority level designation for each attempt;

D. selecting the highest priority level designation of said requests;

E. selecting the highest priority level designation of said attempts;

F. comparing said highest priority level designation of said selected request and said highest priority level designation of said selected attempt; and G. initiating file transfer procedures for said selected request if its priority designation is higher than that of said selected attempt and initiating file transfer procedures for said selected attempt if its priority designation is higher than that of said selected request.

* * * * *